(12) United States Patent
Deak, Sr.

(10) Patent No.: US 9,673,683 B2
(45) Date of Patent: Jun. 6, 2017

(54) RECIPROCATING MAGNET ELECTRICAL GENERATOR

(71) Applicant: David Deak, Sr., Nesconset, NY (US)

(72) Inventor: David Deak, Sr., Nesconset, NY (US)

(*) Notice: Subject to any disclaimer, the term of this patent is extended or adjusted under 35 U.S.C. 154(b) by 0 days.

(21) Appl. No.: 14/535,498

(22) Filed: Nov. 7, 2014

(65) Prior Publication Data
US 2016/0134173 A1 May 12, 2016

(51) Int. Cl.
| | |
|---|---|
| F02B 63/04 | (2006.01) |
| H02K 7/18 | (2006.01) |
| H02K 35/02 | (2006.01) |
| H02K 33/00 | (2006.01) |

(52) U.S. Cl.
CPC .......... *H02K 7/1876* (2013.01); *H02K 35/02* (2013.01)

(58) Field of Classification Search
CPC .............................. H02K 7/1876; H02K 35/02
USPC .............................................. 290/1 A; 310/15
See application file for complete search history.

(56) References Cited

U.S. PATENT DOCUMENTS

| | | | | | |
|---|---|---|---|---|---|
| 3,673,999 | A * | 7/1972 | Lacy | .................. | F02B 71/00 123/149 H |
| 3,984,707 | A * | 10/1976 | McClintock | ........... | H02K 39/00 310/15 |
| 4,315,197 | A * | 2/1982 | Studer | ............................ | 318/135 |
| 7,151,332 | B2 * | 12/2006 | Kundel | .................. | H02K 49/10 310/15 |
| 7,315,098 | B2 * | 1/2008 | Kunita | ............... | A61C 17/3445 15/22.1 |
| 7,382,106 | B2 * | 6/2008 | Kundel | .................. | H02K 49/10 310/15 |
| 7,400,069 | B2 * | 7/2008 | Kundel | .................. | H02K 49/10 310/15 |
| 7,688,036 | B2 * | 3/2010 | Yarger et al. | .................. | 320/137 |
| 7,906,877 | B2 * | 3/2011 | Okada | ....................... | B30B 1/42 310/101 |
| 8,629,572 | B1 * | 1/2014 | Phillips | .......................... | 290/53 |
| 8,907,505 | B2 * | 12/2014 | Fortier | ................. | A43B 3/0015 290/1 R |
| 9,303,628 | B2 * | 4/2016 | Fortier | ................. | A43B 3/0015 |
| 2003/0155771 | A1 * | 8/2003 | Cheung et al. | ............... | 290/1 R |
| 2003/0197433 | A1 * | 10/2003 | Cheung et al. | .................. | 310/14 |
| 2004/0128781 | A1 * | 7/2004 | Kunita | ............... | A61C 17/3445 15/22.2 |
| 2006/0237968 | A1 * | 10/2006 | Chandrasekaran | .......... | 290/1 R |
| 2006/0244316 | A1 * | 11/2006 | Kundel | .................. | H02K 49/10 310/15 |
| 2006/0244327 | A1 * | 11/2006 | Kundel | .................. | H02K 49/10 310/113 |
| 2006/0267418 | A1 * | 11/2006 | Kundel | .................. | H02K 49/10 310/15 |

(Continued)

FOREIGN PATENT DOCUMENTS

JP         11264368 A  *  9/1999  ............... F03G 7/00

*Primary Examiner* — Pedro J Cuevas
(74) *Attorney, Agent, or Firm* — Joanne M. Martin

(57) ABSTRACT

A short burst electrical energy harvesting generator in one embodiment including a reciprocating magnet, under the magnetic influence of dual repelling magnets, whose travel path oscillates within a centered through hole coil bobbin thereby producing an induced voltage at the coil terminals. This induced voltage can be utilized to power battery-less and wireless remote communications control function such as ISM Band and wireless transmitters and battery-less electronic device applications.

16 Claims, 16 Drawing Sheets

(56) References Cited

U.S. PATENT DOCUMENTS

| | | |
|---|---|---|
| 2008/0048506 A1* | 2/2008 | Deak ............................... 310/12 |
| 2011/0001381 A1* | 1/2011 | McDaniel .............. H02K 21/00 |
| | | 310/152 |
| 2011/0254285 A1* | 10/2011 | Hanchett, Jr. .................. 290/1 R |
| 2013/0033042 A1* | 2/2013 | Fortier ................. A43B 3/0015 |
| | | 290/54 |
| 2013/0088018 A1* | 4/2013 | Kobayashi .................... 290/1 A |
| 2015/0076832 A1* | 3/2015 | Fortier ................. A43B 3/0015 |
| | | 290/1 R |
| 2015/0091395 A1* | 4/2015 | Spivak ................... H02K 33/12 |
| | | 310/20 |
| 2015/0091479 A1* | 4/2015 | Spivak ................... B60L 11/12 |
| | | 318/139 |

* cited by examiner

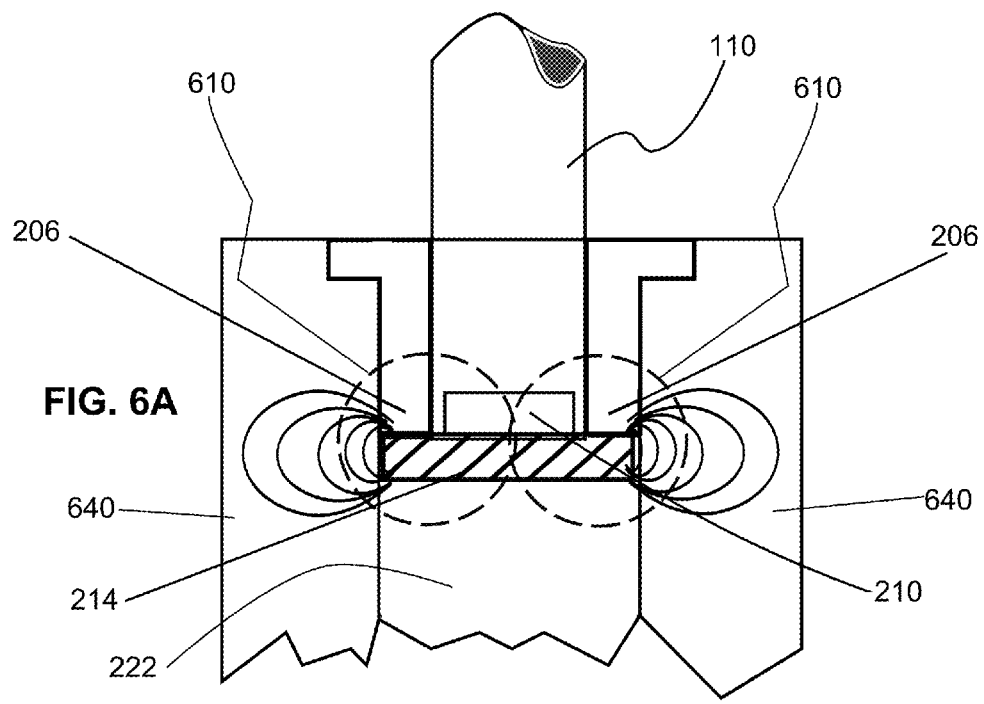
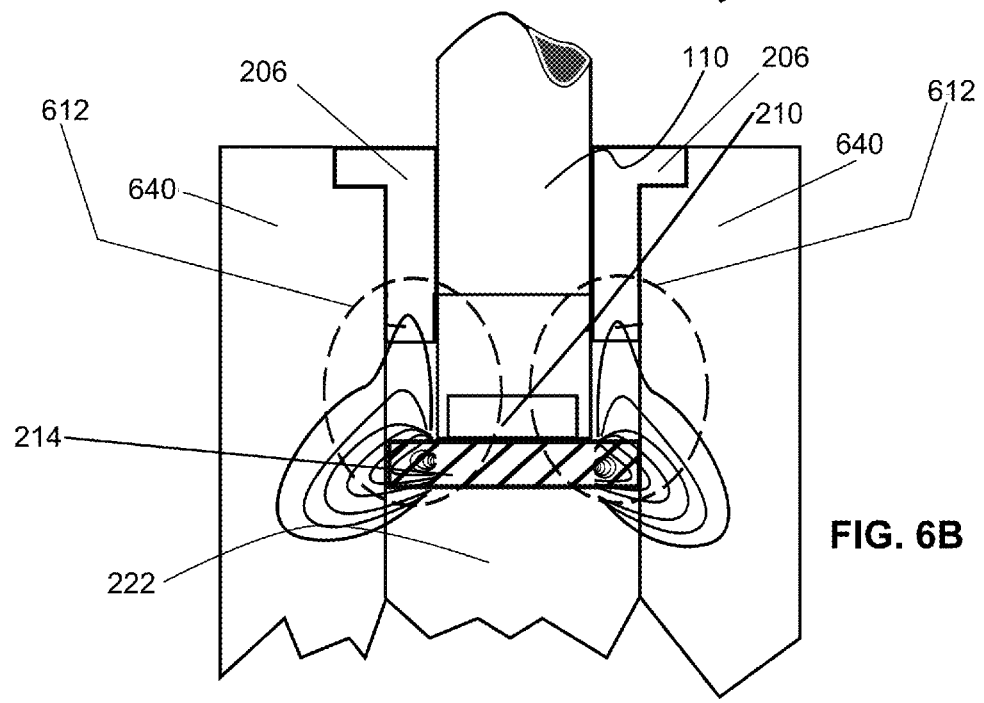

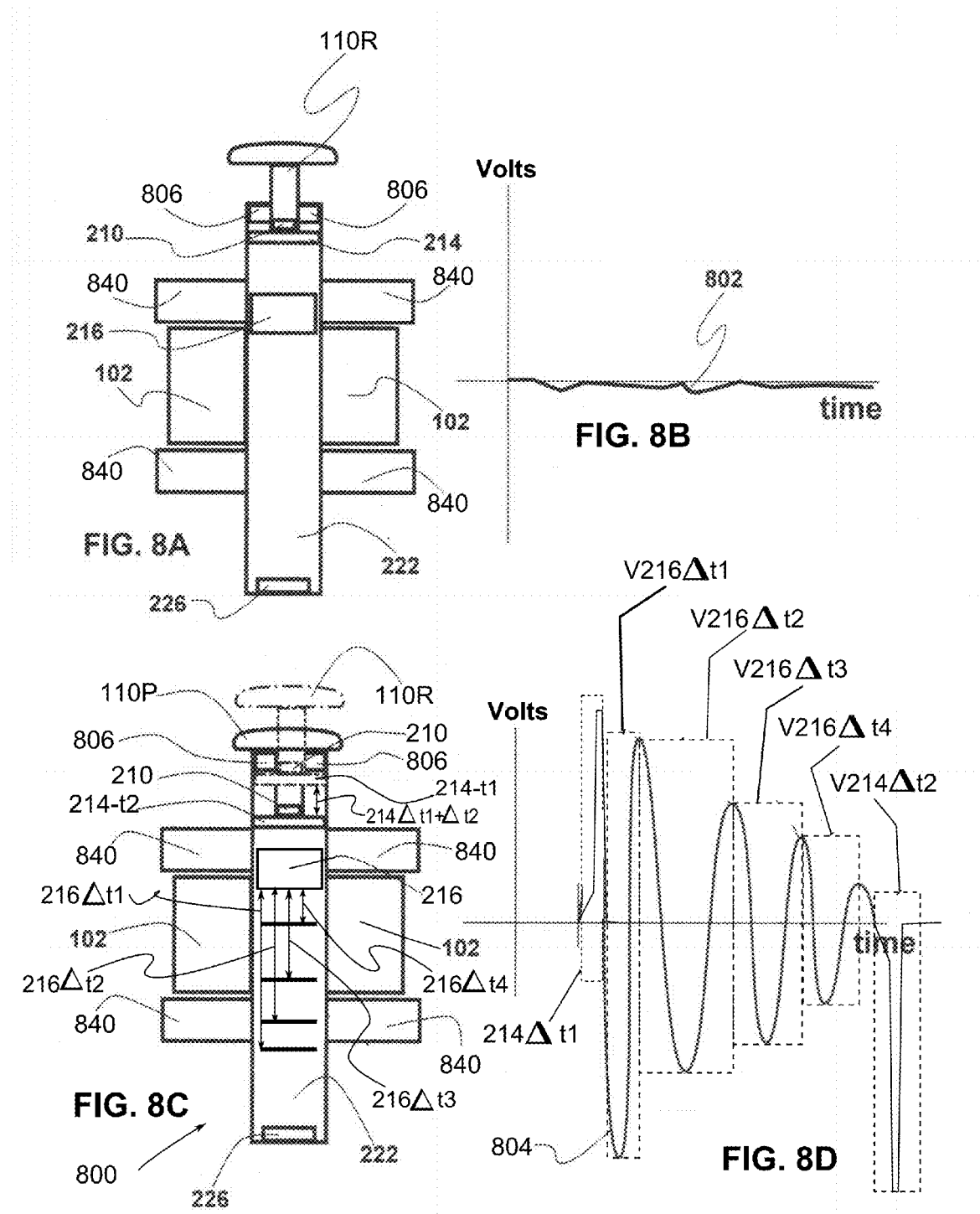

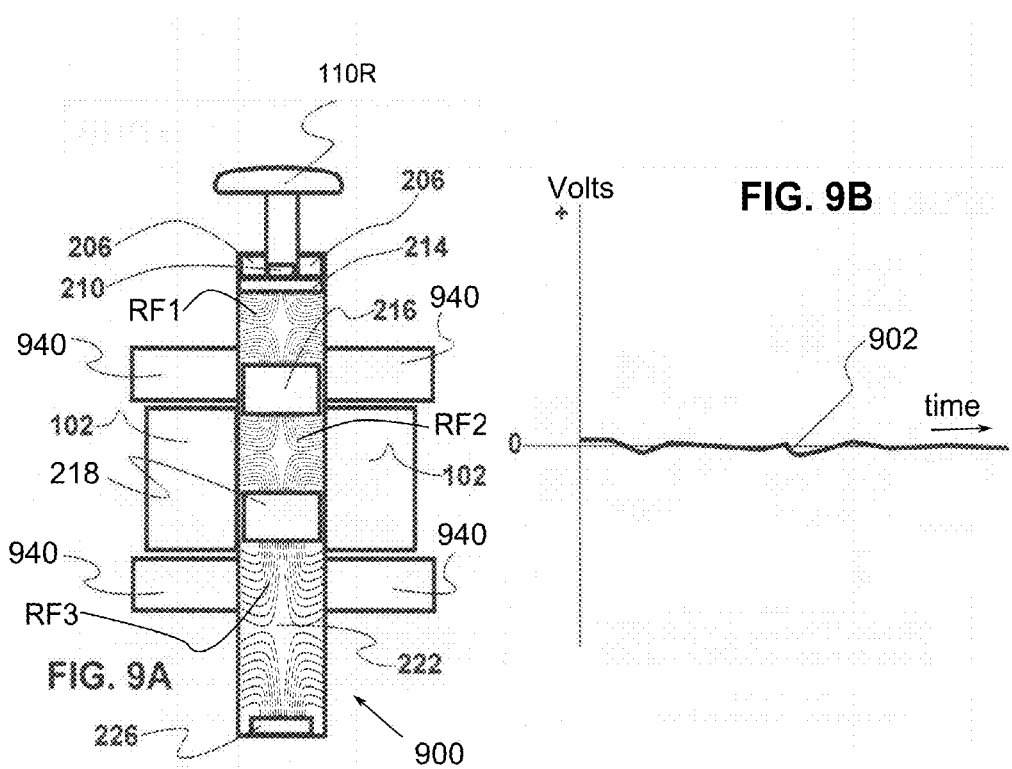

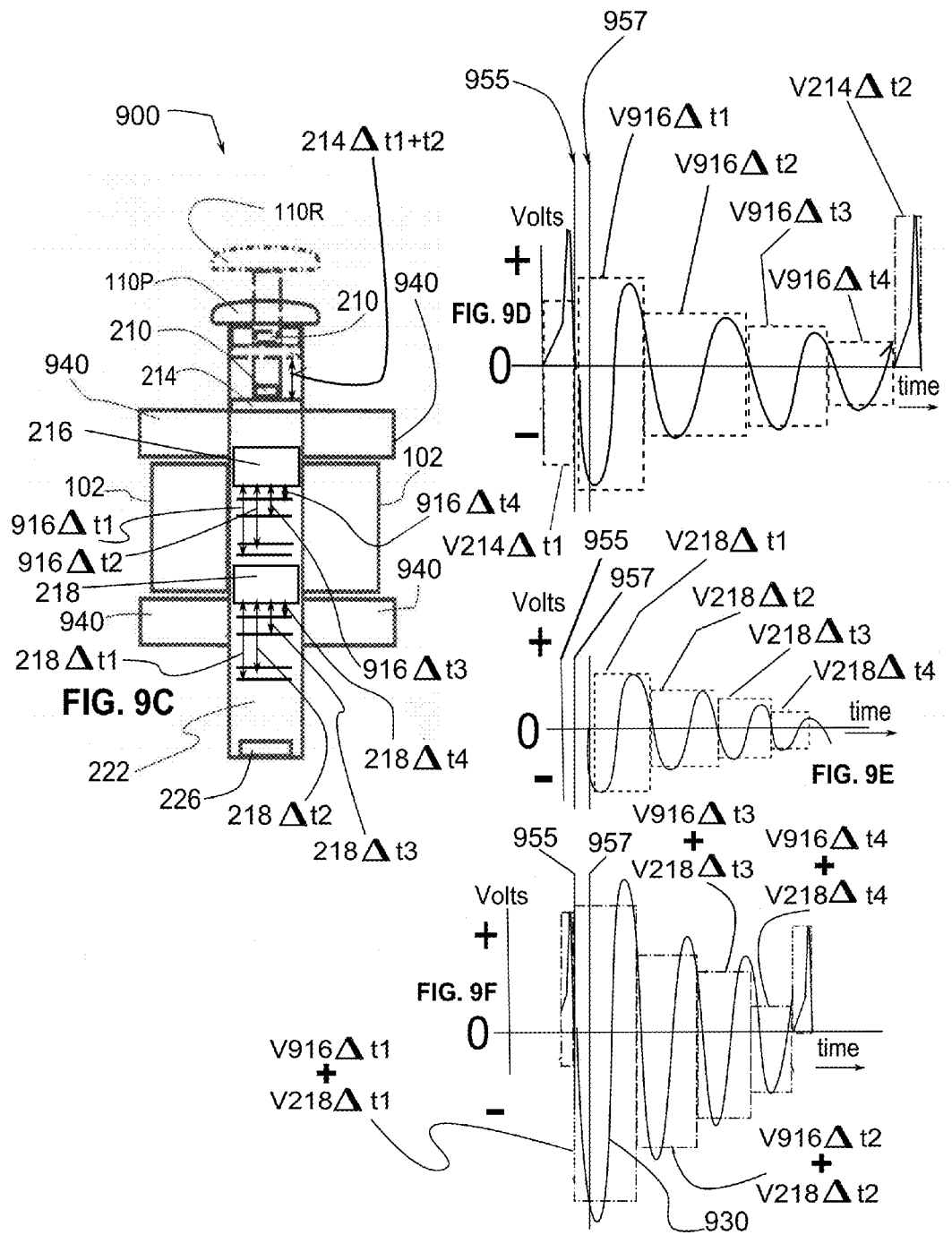

RECIPROCATING MAGNET ELECTRICAL GENERATOR

FIELD OF THE INVENTION

The present invention relates to electric generators and the generation of electricity from same, in particular, to energy harvesting generators having movable magnets therein.

BACKGROUND OF THE INVENTION

Since the inception of Galvani and later Faraday in 1821 and in 1831; the evolution of electric generators has progressed with the conventional knowledge of moving a coil through a stationary magnetic field or in some demonstrable instances, the motion of a magnet through a stationary coil. However the dominating influence of generators incorporating an internal moving coil about a stationary magnetic field remains the mainstay of global electrical power generation on any scale. Further, in cases of a magnet in motion about a stationary coil, the shape of the magnet(s) is typically of the bar, horseshoe, or other non-spherical magnet shape means; and not a magnetic shape of sphere as part and parcel to the magnet(s).

Available short burst energy harvesters are offered commercially an energy harvesting generator with an output pulse time duration of 1 to 10 milliseconds or less and a non-sinusoidal transient voltage pulse. Transient noise pulses differ from the short-duration impulsive noise in that they have a longer duration and a relatively higher proportion of low-frequency energy content, and usually occur less frequently than impulsive noise. The sources of these transient noise pulses in the prior generators are varied electromagnetic devices that generate an output by quick magnetic pole flipping with an initial pulse of relatively short and has a duration on the order of 1 to 10 milliseconds having limited use.

SUMMARY OF THE INVENTION

The present invention provides a reciprocating magnet, typically set into motion by an external push force from a finger, human or otherwise applied by a push-button connected to a launching magnet that abruptly moves, through a through hole at the top of the coil bobbin, to apply a repelling to an (oscillatory) reciprocating second magnet that is magnetically suspended within the through hole within or near the coil bobbin. This reciprocating magnet hovers (floats) within the coil bobbin and hovers (floats) due to a stationary repelling magnet held stationary in a magnet well, disposed at or beyond the end of the coil bobbin opposite the top of the coil bobbin where the push-rod and launching magnet reside.

The present invention provides an extended burst energy harvesting generator by greatly increasing the output pulse magnet motion time duration by an order of magnitude over the pulse time duration of prior generators, whereas the output signal tail of present embodiments have a significantly longer duration e.g. 50 milliseconds after the 1 to 5 millisecond initial energy output. The type of electrical waveform produced from this energy-harvesting generator is typically a damped AC (alternating current) sinusoidal or non-sinusoidal waveform whose amplitude approaches zero as time increases.

The present invention according to exemplary embodiments generates a pulse duration in a range of 40 to 340 milliseconds by desire and design with a damped sinusoidal waveform lasting for approximately 340 milliseconds of useful output at the coil terminals and having a peak-to-peak voltage of 30 volts or more with the present invention's various embodiments described hereafter. With this long pulse duration, and if the present invention is used as a battery-less power source for an portable electronic devices, e.g. an ISMB and (868 MHz in the UK and EU and 915 MHz in the USA) transmitter, significant to allow a substantial amount of microprocessor programming could be executed.

In additional the novelty of the present invention extends itself to being simple in operation with few components, and easy to mass produce compared to all of the prior art referenced above. With the advantage of easy and quick mass production the present invention in a production embodiment, is economical to produce and market.

The general equation for an exponentially damped sinusoid may be represented as:

$$y(t) = A \cdot e^{-\lambda t} \cdot (\cos(\omega t + \phi) + \sin(\omega t + \phi))$$

Where:
y(t) is the instantaneous amplitude at time t.
A is the initial amplitude of the envelope.
$\lambda$ is the decay constant.
$\phi$ is the phase angle at some arbitrary point.
$\omega$ is the angular frequency.
which can be simplified to $$y(t) = A \cdot e^{-\lambda t} \cdot (\cos(\omega t + \phi))$$

Where:
$\phi$ is the phase angle at t=0

The exemplary embodiments according to the present invention typically generates a damped sinusoidal or irregular bipolar waveforms for electrical energy harvesting for any useful and applicable purpose where the need and desire for eliminating a battery is the goal.

An embodiment of the invention is an arrangement of a reciprocating cylindrical first magnet that is disposed within a centered though hole of a coil bobbin and is free to move substantially from top to bottom of the coil bobbin's centered through hole that has its hole diameter slightly larger than the diameter of the cylindrical reciprocating magnet. The coil bobbin has a plurality of turns of enameled copper wire, wound around the central portion of the bobbin with the coil terminal ends being terminated and made available for connexion to some electrical load for power consumption.

The action of the reciprocating first magnet periodically moving in and out of the area in the bobbin's centered through hole has its magnetic lines of force cutting through the coil windings and inducing a voltage that when applied to an electrical load will cause current to flow in a closed electrical circuit. This described reciprocating action that is one of the novelties with the invention's embodiments is caused by a second magnet that is disposed on one end of a push-rod that moves through a hollow magnetic metal cylindrical guide that is disposed in the top section of the through hole coil bobbin and its magnetic pole facing the reciprocating first magnet so that both facing magnetic poles are like (repelling) magnetic poles. Further the first magnet, which is movable, is in gravitational equilibrium (floating) in the immediate vicinity of the coil winding due to the second magnet (that repels the first magnet) and a third magnet (repelling) disposed and secured stationary within a magnet well means at the opposite end of the coil bobbin. This third magnet (that repels he first magnet) has one of its magnet poles facing the first magnet in an arrangement that has the two facing poles to be in like pole repelling mode.

The conclusive "non-pushed-rest-mode" of the generator embodiment is such that the first magnet remains in gravitational equilibrium hovering within the centered through hole of the coil bobbin and sits in the immediate vicinity of inner section of the coil winding only separated by the through hole wall thickness that remains thin as possible, without compromising the physical strength of the wall, in order to allow the magnetic field of the first magnet (hovering) be as close as possible to the coil windings for optimum Faraday emf induction.

Faraday's Law of emf induction, for a tightly wound coil of wire, composed of N identical turns, each with the same $\phi_B$ is $$\varepsilon = -N \frac{d\phi_B}{dt}$$

where N is the number of turns of wire and $\phi_B$ is the magnetic flux through a single loop.

Mathematically related is the magnetic field B axis (measured in Tesla) of an ideal dipole measured along its axis is $$B = \frac{\mu_O}{4\pi} * \frac{2\mu}{d^2}$$

where $\mu_O$ is the permeability constant ($4\pi \times 10-7$ T m/A), d is the distance from the center of the dipole in meters and $\mu$ is the magnetic moment. The magnetic moment $\mu$ measures the strength of a magnet, much like electrical charge measures the strength of a electric field source. The magnetic pole arrangement of the three magnets are such that they all repel each other (end to end and pole to pole) when they are aligned for proper operation.

The present invention is completely operational in any physical orientation in a gravitational field (earth) or in outer space where there exists no gravity or in the case of satellite orbits, micro-gravity. Corresponding design considerations made according to the present invention would allow for a calculated variance in the embodiment's magnets with their field strength, their size, and their displacement and separation distance in such varried environments.

An alternate embodiment of the invention, different from the first embodiment described above, is to include a first magnet in gravitational equilibrium and a second magnet in gravitational equilibrium and that these two magnets are arranged to repel each other and they both hover in a rest state within the center through hole of the coil bobbin winding and they are under the influence of a third push-rod magnet that is disposed and is movable through a magnetic metal hollow cylindrical guide. This third push-rod magnet repels serially both the first and second magnets. Further the first and second magnet are serially repelled by a fourth magnet disposed in a magnet well at the opposite end of the coil bobbin from the top end that contains the push-rod repelling magnet. This arrangement now has two hovering magnets reciprocating within the coil bobbin's coil winding, so arranged that the first hovering magnet is situated at the top portion of the coil winding, and with a air gap between them, the second hovering magnet is situated at the lower portion of the coil winding. In effect this can be seen as two magnets able to reciprocate, under the push influence repulsion (downward) of the third magnet and the opposite repulsion push (upward) influence of the fourth magnet, in and out of the coil winding section with the air gap acting as a bouncing spring action with a small time delay in the oscillating movement of each. One of the advantages of this embodiment is to develop a larger induced voltage and possible longer pulse time durations for certain applications so desired.

Another alternate embodiment of the present invention is to include a stop barrier wall in the middle of the coil bobbin, comprised of a thin magnetic metal layer that is disposed between two thin non-metal (plastic) layers and they are stationary and fixed within the center of the coil bobbin's hole that is now defined as two separate blind hole volumes; one from the top portion of the first blind hole volume to the middle of the coil bobbin, which is the bottom of the first blind hole volume and the other from the bottom of the second blind hole volume to the middle of the coil bobbin. This alternate embodiment now has a first magnet that is disposed within the first blind hole volume and sits at the bottom of the first blind hole volume and is magnetically attracted to the thin magnetic metal layer that is disposed between two thin layers of non-metal (plastic) barriers and is a polarity reference for defining the positioning of the other magnets for proper operation; an instance can be where this first magnet has its South pole attracted to the metal layer and by being separated from immediate direct contact, the attractive force is weakened by the small separation distance involved intentionally as part of the novelty. This alternate embodiment also has a second magnet that is disposed within a second blind hole existing in the bottom half of the coil bobbin and having its South pole facing the South pole of the first magnet by a finite distance within the bottom blind hole configuration. There is a third magnet that is fixed and permanently bonded to a magnet well disposed at the bottom of the second blind hole volume and this third magnet repels and provides a pushing force on the second magnet that is disposed within the second blind hole existing in the bottom half of the coil bobbin. There is also a fourth magnet that is fixed and permanently bonded to a push-rod that fits into, and is movable through, a magnetic metal hollow rod guide and has one of its magnetic poles situated to repel the first magnet that is disposed within the first blind hole volume by a magnetic metal rod guide and sits at the bottom of the first blind hole volume and is magnetically attracted to the thin magnetic metal layer. In a typical rest (no push force condition) state the first magnet is attracted to and sticks to the push-rod guide. This attracting force overcomes the repel force between the first magnet and the fourth magnets since for proper operation the first and fourth magnets have to be repelling each other.

Furthermore, the various embodiments according to this invention are easy to construct with the minimum of components required, which makes this invention easy and economical to mass produce. Another advantage is that there are no mechanical springs required for the push button spring back action to occur is done by magnets in repulsion, where the magnetic force of repulsion is $$F_r = \kappa_{air} \frac{(\phi_a * \phi_b)}{d^2}$$

Where
$F_r$ is the force of repulsion
$K_{air}$ is the magnetic permeability of air
$\phi_a$ and $\phi_b$ are the two repelling magnetic field intensities at heir pole surface
and d is the distance between the magnetic poles.

BRIEF DESCRIPTION OF THE DRAWINGS

These and further features of the present invention will be better understood by reading the Detailed Description, taken together with the Drawings, wherein:

FIG. 6A is a cutaway elevation view detail of a the region of a launching magnet being drawn to the magnetic cylindrical guide by magnetic attraction;

FIG. 6B is a cutaway elevation view detail showing the result of the action of pushing a push-button push-rod during operation having separated a magnetically attracted cylindrical guide from an exemplary moved launching magnet;

FIG. 8A is an illustration of and exemplary embodiment with one reciprocating magnet in a rest (non-pushed) state;

FIG. 8B is a plot of typical graphical output of zero volts at the coil winding terminals of FIG. 8A with the reciprocating magnet substantially at rest;

FIG. 8C is an illustration of the embodiment of FIG. 8A showing a pushed down state and instant return of the push-rod component;

FIG. 8D is a time graph showing the generated voltage at the coil winding terminals over time during a typical damped sine wave series of voltage diminishing cycles;

FIG. 9A is an illustration of an embodiment having two reciprocating magnets in a rest (non-pushed) state;

FIG. 9B is a plot of the typical graphical output of zero volts at the coil winding terminals of FIG. 9A along a time line with background low level ambient electrical noise.

FIG. 9C is an illustration of the embodiment of FIG. 9A showing two reciprocating magnets in a pushed down state and instant return of the push-rod component;

FIG. 9D is a time plot showing the generated voltage at the coil winding terminals of FIG. 9C during a typical damped sine wave series of voltage diminishing cycles;

FIG. 9E is a typical oscilloscope trace of an exemplary generator output during a pushed and released state.

FIG. 9F is an empirical mathematically graphical predictions of the resultant output waveform 930 developed from the algebraic combination of the associated waveforms produced by the first 216 and second 218 reciprocating repel magnets.

DETAILED DESCRIPTION OF AN EXEMPLARY EMBODIMENT

Figure 1:
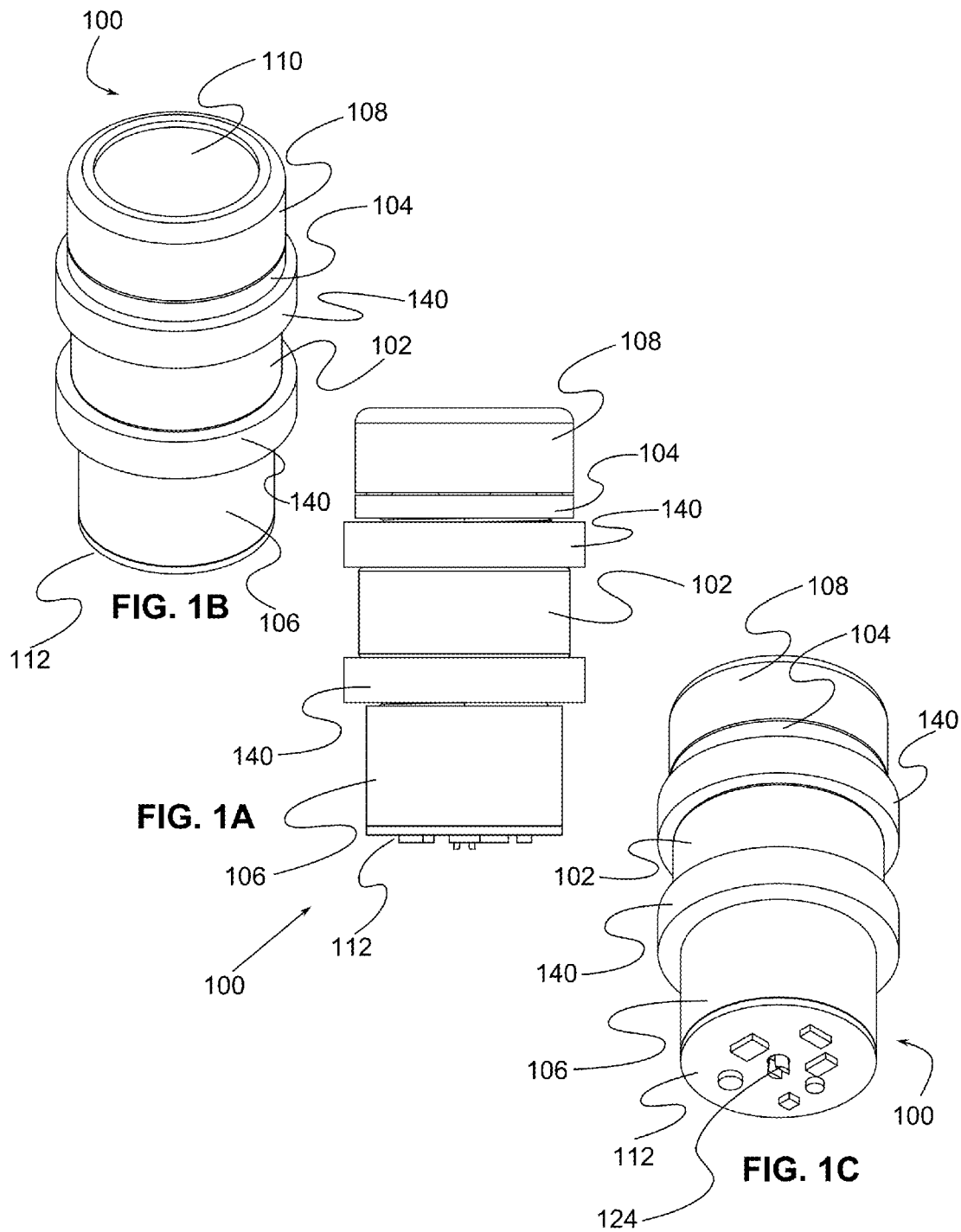
FIG. 1A, FIG. 1B, FIG. 1C an elevation and two perspective drawings respectively, of one embodiment perspective drawings of the reciprocating magnet electrical generator respectively, of one embodiment of the reciprocating magnet electrical generator according to the present invention.

FIGS. 1A, 1B, and 1C are three alternate views of an embodiment 100 of the present invention that is comprised of a coil bobbin 140, which has an electrical coil multi-winding 102 wound around the coil bobbin 140. A screw cap 104 secures the coil bobbin 140 and is inserted through a hole in a typical panel setting. After the screw cap 104 is screwed down and secures the coil bobbin 140 to a typical panel setting, a top cap 108 is inserted over the push button plunger 110, typically including a top cap (receiving an external actuating force, e.g. a finger push) and a shaft extending into the coil bobbin, to secure the push button plunger and contain it within the hollow top cap 108. At one end (bottom) of the coil bobbin 140 there is a screw on magnet well 1076 and includes a magnet 226 in FIG. 2 and at the bottom of this magnet well is attached to a snap-on fastener 124 in FIG. 2, a transmitter circuit board 112 that is part of a typical application for the present invention to provide power for.

Figure 2:
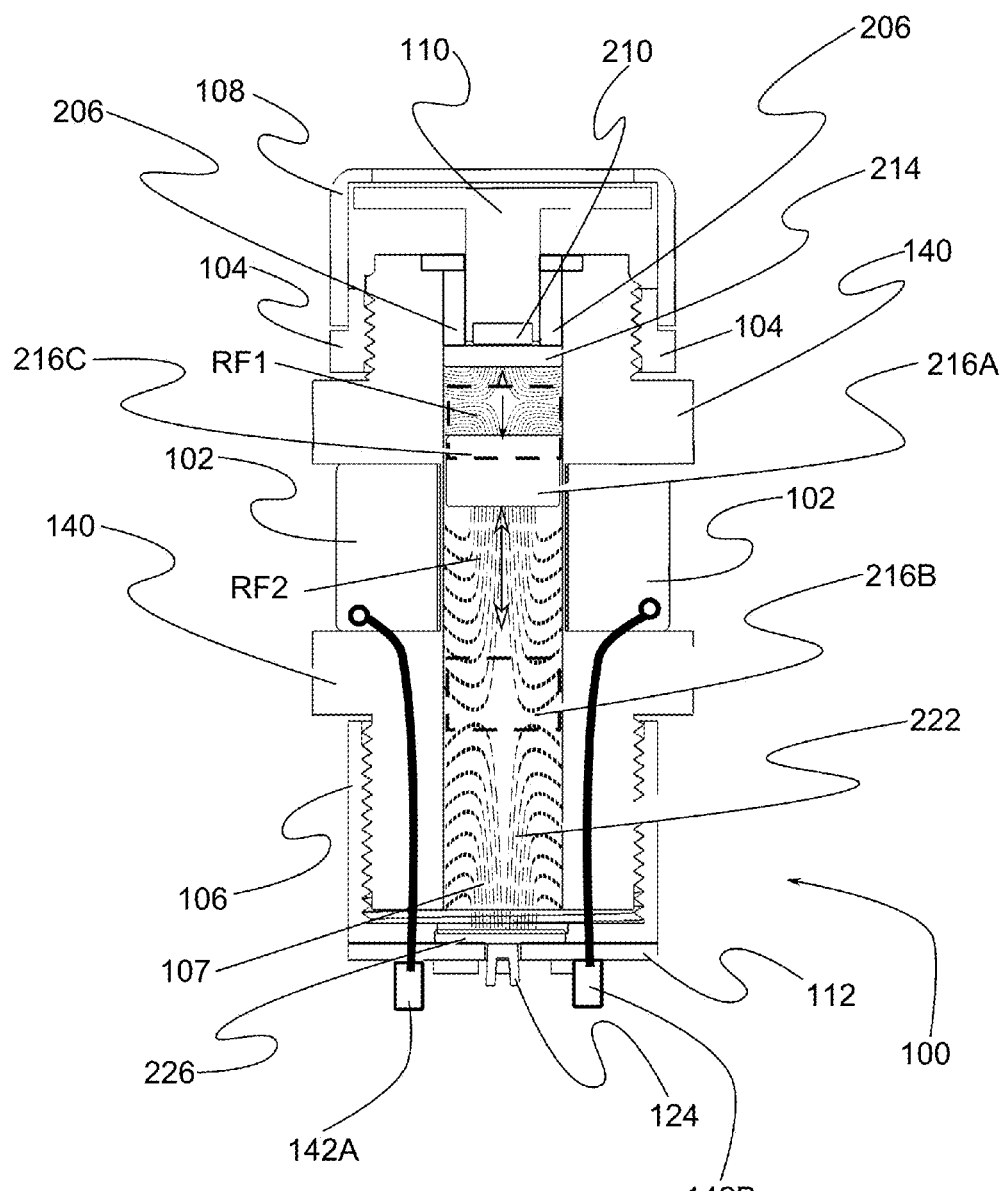
FIG. 2 is a cutaway elevation view of the reciprocating magnet electrical generator of the embodiment of FIG. 1A, illustrating the operation of the reciprocating magnet set into damped oscillation by the push button actuator.

FIG. 2 shows a cutaway view of the embodiment of FIG. 1A, comprising the coil bobbin 140 with coil winding 102, the screw cap 104 that fastens and secures the coil bobbin assembly 140 & 102 to a typical switch panel installation, but not limited to just panel installation. There is the top cap 108 that snaps onto the screw cap 104 and this top cap 108 holds the push button plunger 110 within it and typically limits the push button plunger travel to within its volume limits. Attached at the bottom of the pushbutton plunger is a small pilot magnet 210 that is magnetically attracted to a magnet 214 that launches another magnet 216 into motion. By definition a rest "non-pushed state" or quiescent state is when the pushbutton plunger assembly 110 is idle and not pushed inward by some external force such as a human finger, but not limited to a human finger. In a rest "non-pushed state," this launching magnet 214 is held in magnetic contact with the pilot magnet 210 by unlike magnetic pole attraction between them. In addition there is disposed and seated in the top portion of the coil bobbin 140 a push button plunger guide hollow cylindrical washer 206 that comprises a magnetic metal (e.g. electrical steel) or other magnetic material (e.g. metallic glass) and the launching magnet 214 is magnetically attracted to it and is held along with the pilot magnet 210 and consequently the push button assembly 110 in the pushed up rest position where the push button plunger is in mechanical communication with the top cap 108. This embodiment eliminates mechanical springs used for positioning magnets and surrounding components.

The launching magnet 214 is positioned to repel, by the magnetic field RF1, the second magnet 216A and there is a third, repel magnet 226 that is disposed an secured at the bottom of a magnet well 107 at the closed end of threaded cap 106, which is screwed onto the bottom section of the coil bobbin 140. There is a hollow chamber within bobbin 140 comprised of a centered through hole or aperture 222 within the coil bobbin 1400 and this centered through hole is slightly larger in diameter than the second reciprocating magnet 216A so it is free to move axially (with minimum friction) within a volume section of the coil bobbin 140 along the aperture 222 length where the coil winding surround at least part of the aperture containing the second magnet and where the second magnet (216A, 216B, 216C) magnetic field lines RF1, RF2 at least partially intersect the coil winding 102. Terminal leads 142A, 142B from the coil winding 102 are connected to provide power (voltage, current) induced by reciprocating magnets as described herein upon pushing in of the push button plunger 110 and causing the second magnet to oscillate between region of the launching magnet 214 and the third repelling magnet 226 located within a well 107 in cap 106 at one end of bobbin 140 aperture 222, by the two repelling magnetic fields RF1 & RF2, thus moving the reciprocating magnet 216A to move in the region of second magnet position 216B and position 216C and generates, by Faraday induction, a damped AC waveform, where a rectifier and regulator contained in the transmitter module changes the damped AC waveform provided at output terminals 142A, 142B to a DC regulated voltage. Extreme oscillating travel of the reciprocating magnet is within a displacement through the coil winding's bottom region (near magnet 216B) and the coil winding's top region (near magnet 216C).

Figure 3:
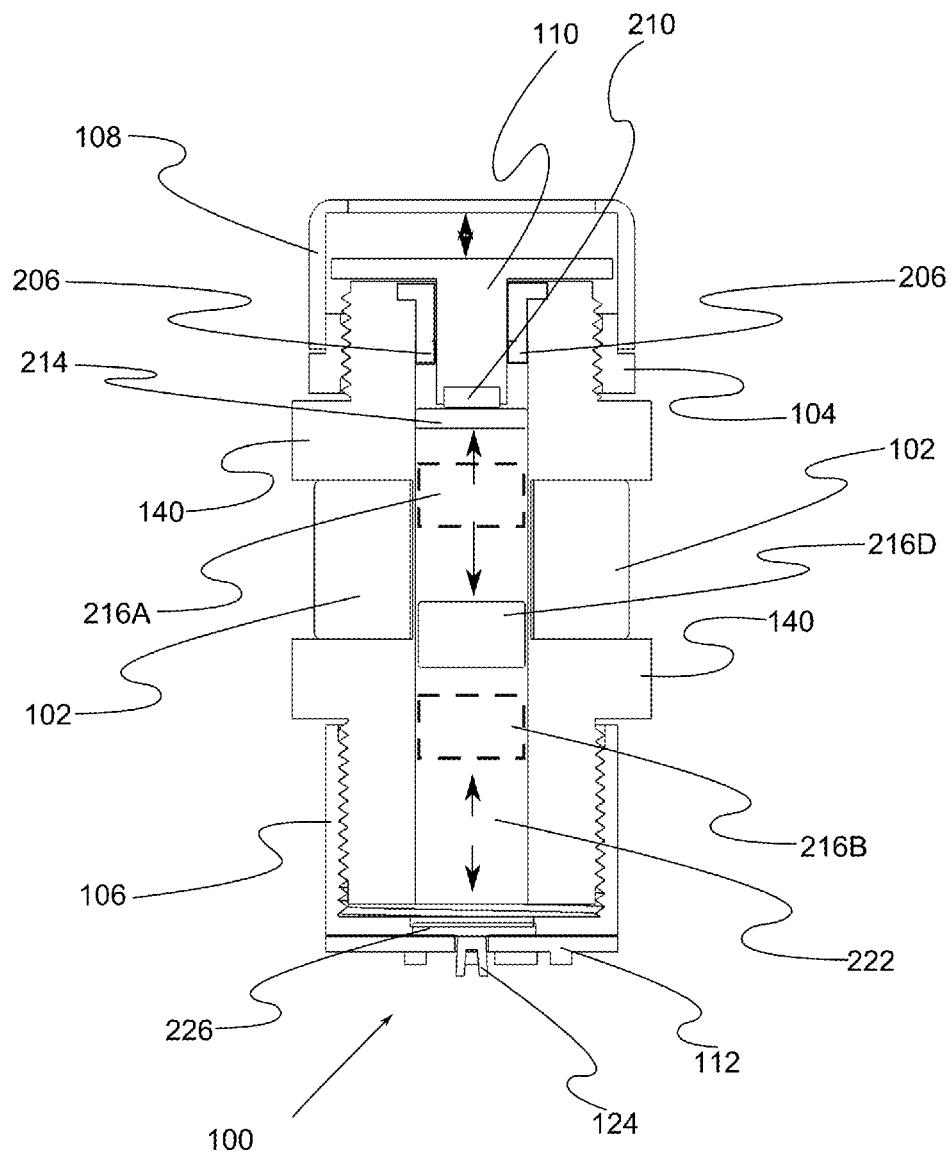
FIG. 3 is a cutaway elevation view of the reciprocating magnet electrical generator of the embodiment of FIG. 1A illustrating the push button actuator in the downward (pushed down) active state.

FIG. 3 is illustrative of when the generator produces instant electrical power from the action of the push button plunger 110 being engaged by being pushed downward by some external applied force (e.g. a finger) and firstly the instant action taking place is to cause the launching magnet 214 to be disconnected from its magnetic attraction to the aperture 222 and this action causes the magnetic field lines to expand outward and cutting through some portion of the coil winding 102 and instantly inducing a voltage spike pulse of a period, e.g. a few milliseconds at the output terminals. Simultaneously the launching magnet 214 repels the second magnet 216A (initial position at aperture 222 end proximal magnet 214) that is floating and movable downward and passing through the coil winding 102 that instantly induces an increasing voltage at the output terminals of the coil winding 102. As this happens, the process of the reciprocating magnet 216B coming closer to the repel magnet 226 and the repelling action between magnets 216 and 226 becomes stronger and reversing the reciprocating magnet 216 downward travel so that the reciprocating magnet 216D now proceed upward back through the coil winding 102 and now induces a varying voltage of opposite polarity to the initial downward condition and is provided at the terminals of the coil winding 102. Thereafter, and as the pushing external force (on push button 110) is released, there are several cycles of time (e.g. tens to hundreds of milliseconds plus the spike pulse of a few milliseconds) wherein the second magnet 216A again changes direction to a downward position 216B and subsequently changing to move upward to an up position 216D to reciprocate until gravity and other frictional forces overcome this movement. The resultant power output is a damped AC sinusoidal waveform that can be utilized for any useful purpose and with sufficient design criteria for a voltage rectification and regulation system connected to the coil winding 102 terminals, a DC regulated voltage range can be produced with power ratings in the tens to hundreds of milliwatts for power with a reciprocating magnet in the range of 5,000 to 10,000 Gauss and a coil 1,000 to 5,000 turns of some appropriate enameled solid copper wire gauge (e.g. #32 AWG).

Figure 4A:
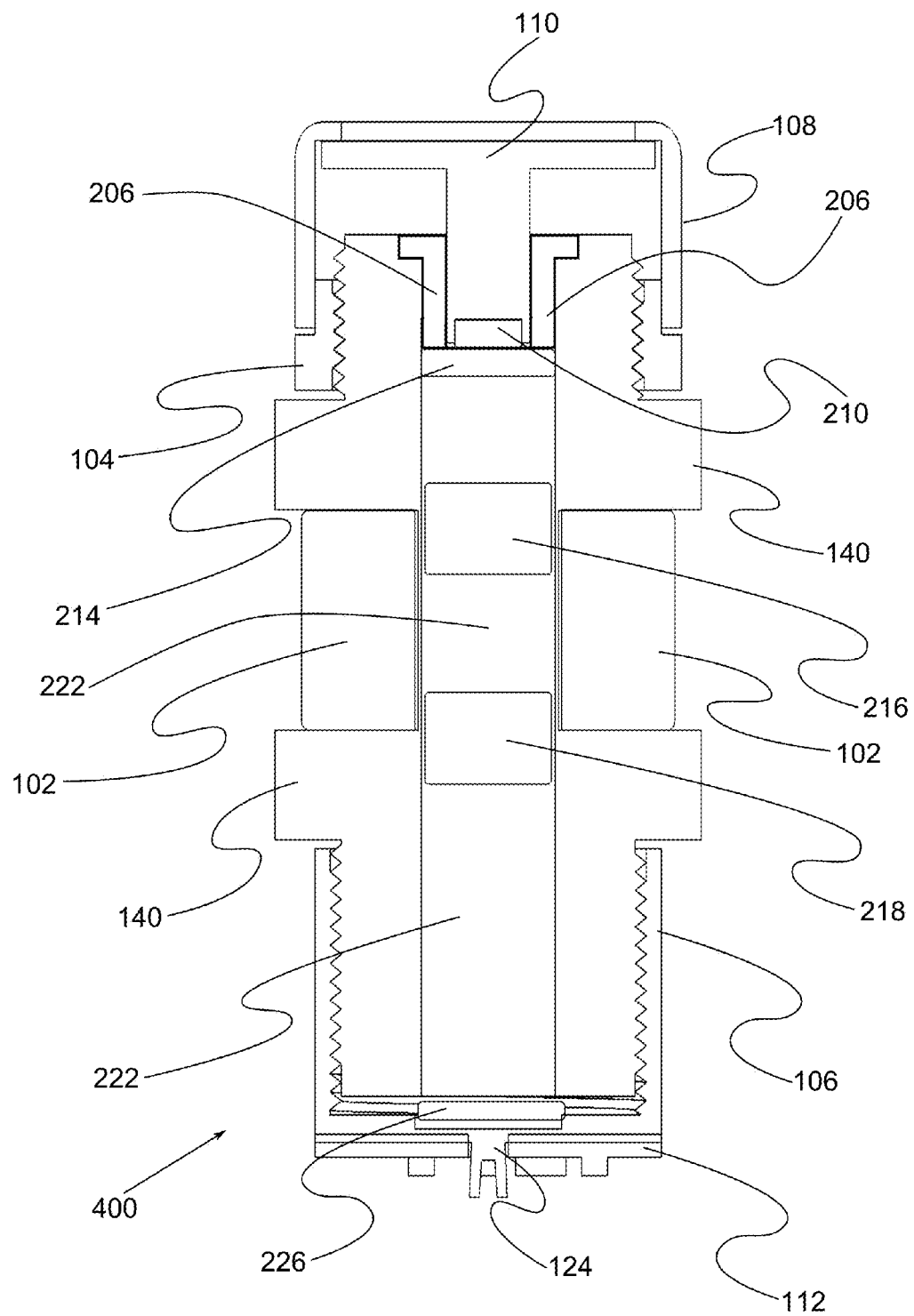
FIG. 4A is a cutaway elevation view of an alternate embodiment showing two reciprocating magnets causing a phase shifted dual damped sinusoidal waveform with the push button actuator being in the upward rest state with no push force.

FIG. 4A is an alternate embodiment 400 of the present invention that utilizes two floating reciprocating magnets 216, 218 in a cascaded arrangement stacked one above the other within aperture 222. The first reciprocating magnet 216 is positioned relatively near the launching magnet 214 (on the top portion of this embodiment when the axis of the aperture 222 is vertically oriented) and the second floating repel magnet 218 is position between reciprocating magnet 216 and repel magnet 226 (under this first floating repel magnet 216) and have facing "like poles" which repel each other. Both the first and second reciprocating magnets 216, 218 reside within the volume section 222 of the coil bobbin 140 where the coil winding 102 that includes a volume region within and beyond the coil bobbin 140. The present embodiment 400 operationally allows the push button plunger attached repel magnet 214 "like pole repels" the first floating repel magnet 216, which repels the second floating repel magnet 218 under it; and the second reciprocating magnet repels the stationary repel magnet 226 disposed within the magnet well 107 and having the same facing poles causing two magnets 216, 218 to reciprocate and each provide magnetic fields moving through coil winding 102 under the push influence of the push button 110 launching magnet 214.

The sequence of events that take place once the push button 110 is pressed, is that the plunger magnet 214 pushes downward, by repelling magnetic lines of force from the same facing poles of each magnet at a distance through air, the first reciprocating magnet 216 which initially pushes downward, by repelling magnetic lines of force from facing same poles and at a distance, against the second reciprocating magnet 218; which in turn moves against and is ultimately repelled by the stationary repel magnet 226 (disposed one end of aperture 222 typically at the magnet well 107). Thereafter, after the second reciprocating magnet 218 inertia (and gravitational force, if present) is overcome by repulsion from magnet 226, the second reciprocating magnet 218 now proceeds to move (upward) away from the stationary repel magnet 226; this action, in repelling sequence, subsequently pushes the first reciprocating magnet 216 upwards toward launching magnet 214 and this action, by repulsion from the same polarity magnet faces, then urges the push button 110 attached magnet 214, which is an aid to resetting the push button 110 in the up rest position to mechanically rest at or near with the top cap 108 serving as a position limit barrier. The reciprocation described continues until the energy of the reciprocating magnets 216, 218 moving mass and repulsion fields is substantially transferred to coil 102 output loads, or otherwise dissipated.

Figure 4B:
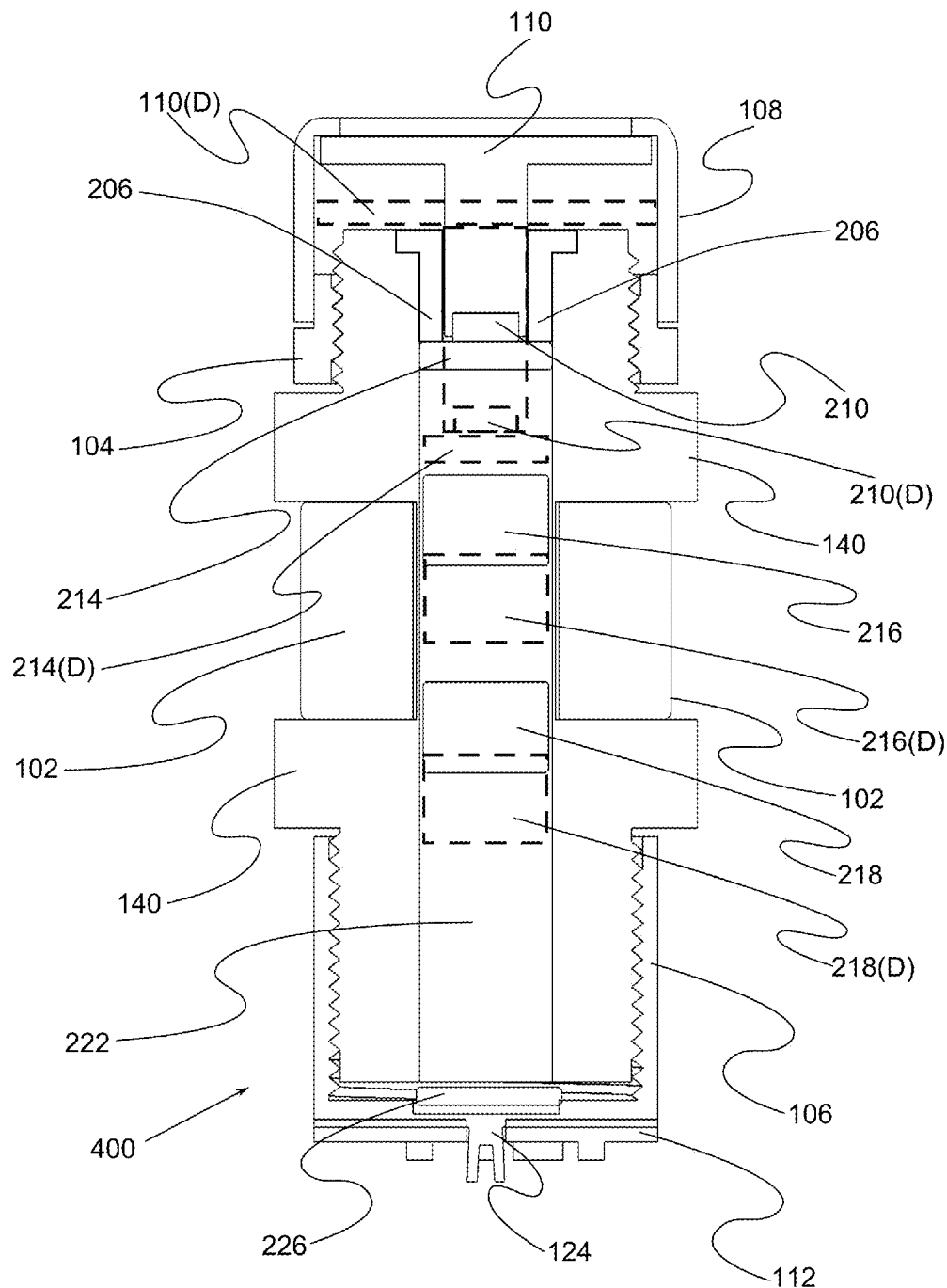
FIG. 4B is a cutaway elevation view of the embodiment of FIG. 4A showing the push button actuator being in the downward activated state.

The sequence of events that take place once the push button shown in FIG. 4A is pressed is further illustrated in FIG. 4B wherein the launching magnet 214 pushes downward from its rest position (seated on 206) to its pushed position 214(D) and the pilot magnet 210, moves with it simultaneously from its attached rest position with the push-button 110 push-rod (that also moves from the rest position to active pushed position 110(D)) to its pushed position 210(D), and by repelling magnetic lines of force of like-facing magnet poles, at a distance through air, the first reciprocating magnet 216 is pushed downward to the pushed position 216 (D), and again by repelling magnetic lines of force of same-facing magnets, against the second reciprocating magnet 218. The repel magnet 226 is mounted and stationary at the end (bottom) of aperture 222 at of the magnet well 107; as the second reciprocating magnet 218D comes closer to the stationary repel magnet 226, the repelling force between these two magnets eventually overcome the magnet's kinetic energy (and force of gravity) and the second floating repel magnet 218 now proceeds to move (upward) away from the stationary repel magnet 226; this action, in repelling sequence, in turn pushes the first reciprocating magnet 216 away (upwards) and this action further forces, by repulsion, urges the push button 110 attached magnet 214, which is an aid to resetting the push button plunger in the up rest position to mechanically connect the push button 110 with the top cap 108 serving as a up position limit barrier. The kinetic energy released by the magnets 214, 216 being pushed and repelled as a result of the external applied finger push will continue to be transformed into potential energy of repulsive magnetic fields and then being overcome by gravity or stored by the magnetic repulsion, will transform back into kinetic energy and this process repeats itself for a few cycles until all of the energy is transferred and/or dissipated and system forces are at equilibrium. This damped oscillatory motion of the first reciprocating magnet 216 and the second reciprocating magnet 218, by the Faraday effect, induces a damped oscillatory AC voltage waveform in the coil winding 102 that is provided at the corresponding terminals.

Figure 5A:
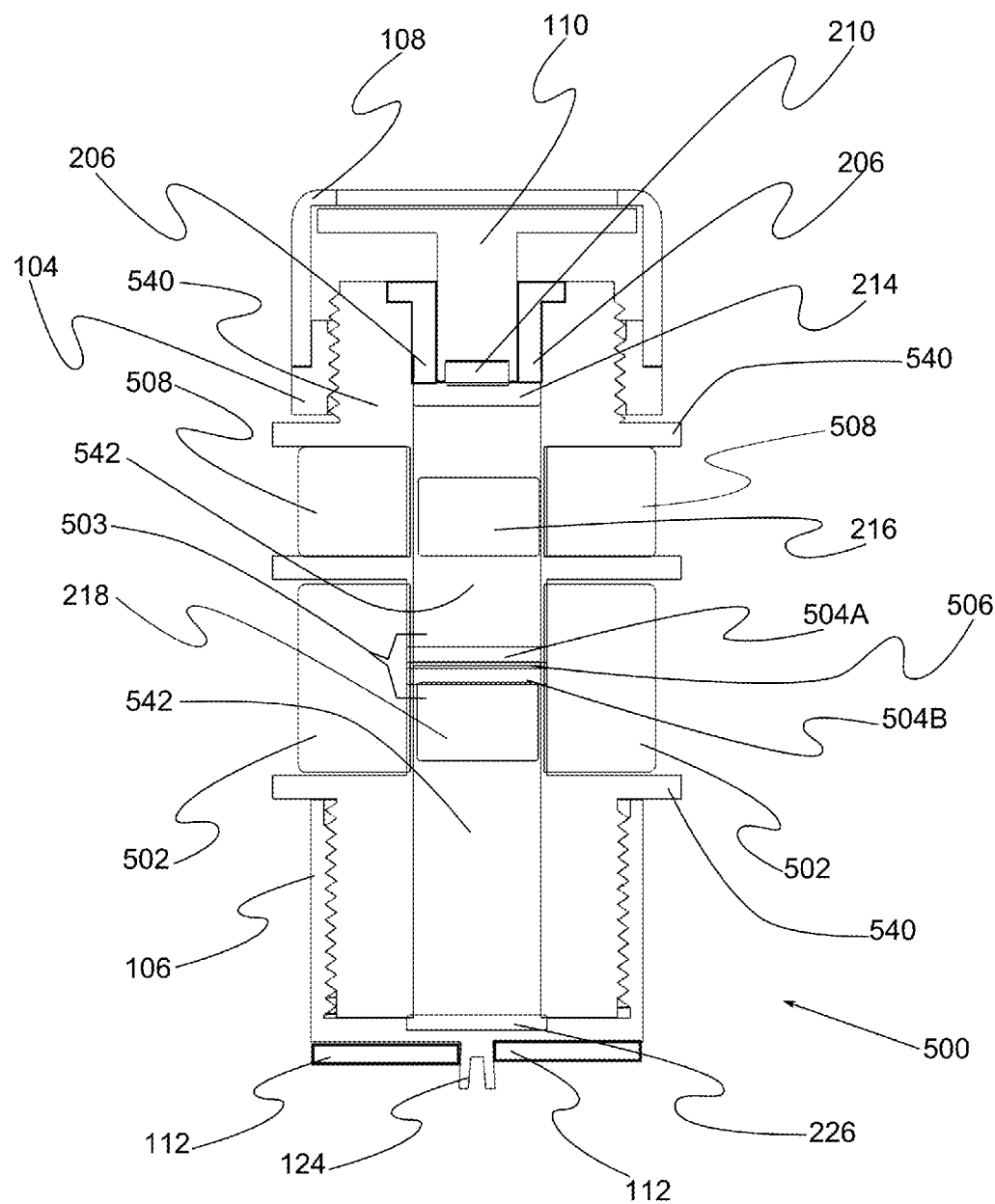
FIG. 5A is a cutaway elevation view of a further alternate embodiment including a magnetic metal barrier used to interrupt and limit magnet travel.

FIG. 5A is a cutaway illustration of another alternate embodiment 500 of the present invention that utilizes two reciprocating magnets 216, 218, and these two magnets 216, 218 encounter a physical barrier 503 comprising a thin layer of magnetic metal or material 506 (e.g. electric grade steel, metallic glass) disposed between two thin layers of non-metallic material 518A & 518B such as plastic layer provides a selectively weakened source of magnetic attractive material for both of the reciprocating magnets 216, 218 even though the two magnets 216, 218 have relative mutually repelling forces, whenever magnets 216 and 218 are separated by the systematic reciprocation described previously, reciprocating magnets 216, 218 are attracted to the thin magnetic metal layer as the permeability of the magnetic metal layer is huge compared to a repelling field separated by a distance selected to provide the reciprocation described previously. The addition of magnetic barrier 503 is designed to alter or balance the capability of embodiment 500 to generating the optimum power output at the coil winding 102 terminals. Accordingly, the balance of magnetic field repelling forces of the launching magnet 214, first reciprocating magnet 216, second reciprocating magnet 218, and the stationary repelling (upward repel force) magnet 226 now include magnetic barrier 503 between reciprocating magnets 216, 218. Further according to this alternate embodiment there are two sections 502, 5084 of the coil winding that are electrically connected in series aiding; the upper section coil winding 508 and the lower section coil winding 502 in one adding series-connected embodiment, comprise the total series aiding coil winding, wherein the first (upper) reciprocating magnet 216 has is greatest electromagnetic induction effect with the upper section coil winding 5084 and the second (lower) reciprocating magnet 218 has it greatest electromagnetic induction effect with the lower section coil winding 502. The quiescent rest state associated with FIG. 5A is a condition (where there is no movement of the magnets and consequently a "no electrical power is generated" state).

Figure 5B:
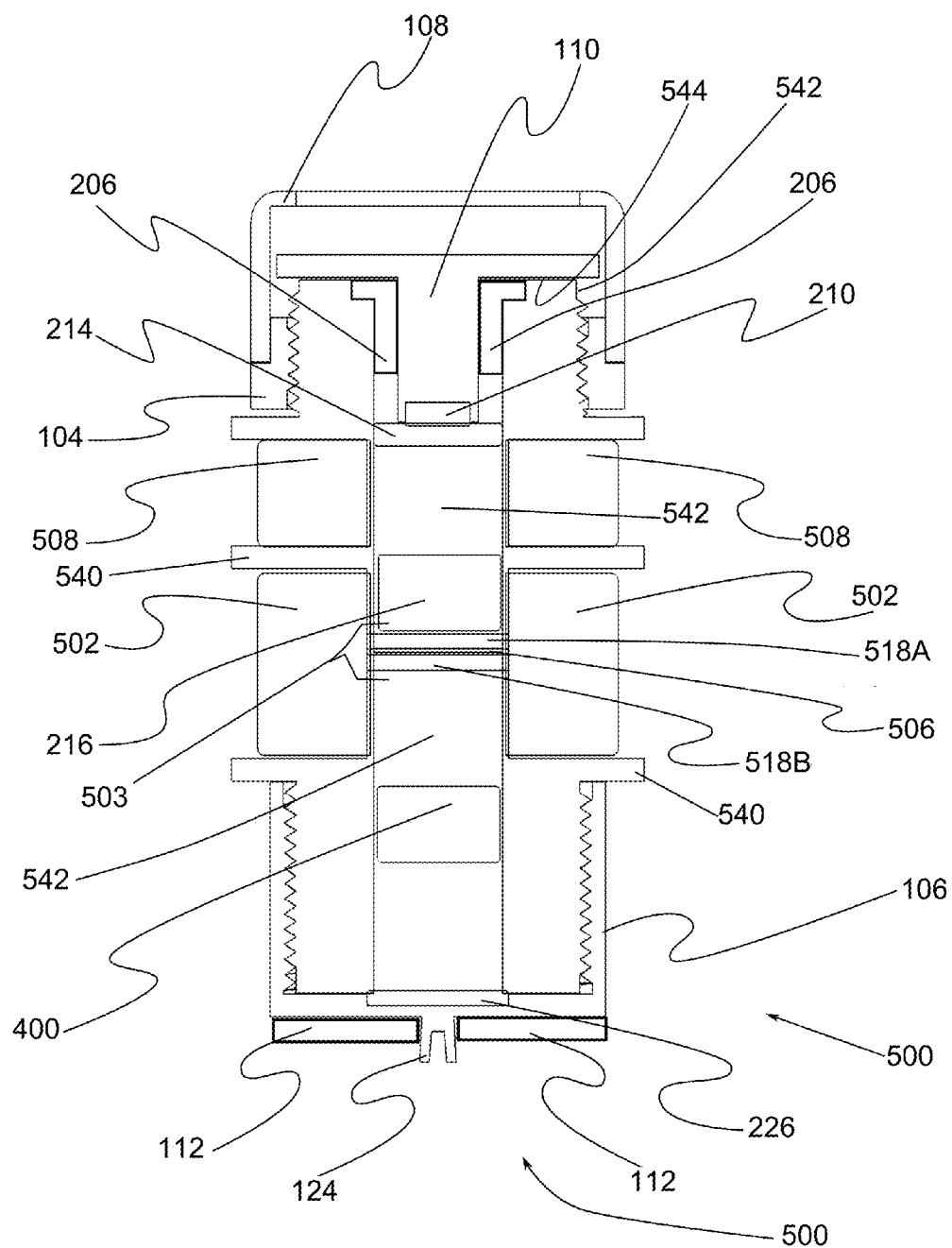
FIG. 5B is a cutaway elevation view of the embodiment of FIG. 5A showing a magnet seated on the magnetic metal barrier.

FIG. 5B is an further illustration of the alternate embodiment 500 of FIG. 5A that is the condition when the push button-rod 110 is moved, by a downward pushing force (e.g. by a finger) and then at a time later is instantly released; and these push-button 110 activating states are the initiating electrical power generation states of the energy harvesting generator according to the exemplary embodiments of the present invention. To proceed the push button push-rod 110 moves downward and away from its top limit imposed upon it by the top cap's 108 under section and further the push button 110 moves until it comes to rest on the end surface 544 of the top threaded section of the dual upper and lower sectioned coil bobbin 540, which retains the wound the upper coil winding 508 and the lower coil winding 502 typically between separated radial flange portions. This downward push force moves the push-button 110 push-rod away from the magnetic attracted rod guide 206 comprised of magnetic metal (e.g. electric grade steel) or other material, and into the aperture 222 end (the top) section of the dual section coil bobbin 540, causing disconnection of the magnetic lines of force magnetic attraction of the push-rod guide 206 in seated contact with the launching magnet 214 and initiates a cascaded repelling force action between the launching magnet 214 and the first reciprocating magnet 216 downward until it is attracted to and stops at the "midway disposed" physical and magnetic barrier 503 comprised of the thin magnetic metal layer 506 disposed between two thin layers 518A & 518B of non-metallic material (e.g. plastic) and during the movement downward of the first reciprocating magnet 216, its magnetic lines of force cut through the upper section of the coil winding 508 and induce a voltage at the coil winding's output terminals (not shown), then when the reciprocating magnet 216 movement stops, due to the barrier 503 obstruction, the corresponding magnetic lines of force now collapse and fold into the high permeability magnetic metal thin layer 506 as attenuated by the spacing the non-magnetic layer 518A, this in addition produces an electrical pulse at the output terminals of the coil winding; and at this instant, the repelling first reciprocating magnet 216 instantly causes a repelling force action between itself and the repelling second reciprocating magnet 218, which until the repelling reciprocating first magnet 216 was stopped, the second reciprocating magnet 218 was magnetically attracted weakly and attached to the generally midway disposed physical and magnetic barrier 503 comprised of the thin magnetic metal layer 506 disposed between two thin layers 518A & 518B of non-metallic material (e.g. plastic). When the repelling reciprocating first magnet 216 physically hits the top layer 518A of the physical and magnetic barrier 503, the repelling magnetic field form reciprocating magnet 216 instantly repels the repelling reciprocating second magnet 218 that was weakly magnetically attracted to the bottom of magnetic material 506 through layer 518 and the repelling reciprocating second magnet 218 travels downward towards the stationary repel magnet 226 disposed at the end of aperture 222 and typically bonded to the bottom of the magnet well 107. As the second reciprocating magnet 218 comes closer to the repelling magnet 226, the mutual force of repulsion between the two magnets overcomes the second reciprocating magnet 218 inertia and gravity and the second reciprocating magnet 218 now stops and reverses direction, traveling back through the aperture 220 toward the coils 502, 508 (upward) until it physically hits the bottom layer 518B of the barrier 503 and comes to rest by magnetic attraction between it and is seated thereon. The reciprocating action continues wherein the first reciprocating magnet 218 that was magnetically temporarily attracted to and seated on the top surface of the magnetic barrier 503 is now repelled (upwards) towards the first magnet 214, which in turn urges this first magnet 214 to move away from coil 508 (upwards) and in unison with it causes the push-button 110 push-rod to move upward instantly.

The kinetic energy released by the reciprocating magnets 216, 218 being initially launched into motion by an externally applied force (e.g. a finger push) initially will continue to be transformed into potential energy by repeated interactions of repulsive magnetic fields and then will transform back into kinetic energy, repeating for a number of cycles until all of the energy is removed via the coil output or other losses, and the forces are at equilibrium, and appear as a damped reciprocating motion of the first repel magnet 216 and the second repel magnet 218, inducing a damped oscillatory AC output voltage waveform in the coil winding 102 available at its terminals.

In FIG. 6A, the push button assembly 110 is positioned in its quiescent non-pushed rest state with pilot magnet 210 magnetically attracting and retaining the launching magnet 214, which is also magnetically attracted 610 to the magnetic metal rod guide 206 that is disposed and seated within the coil bobbin 640 top aperture (through hole) 222. This magnetic attraction 610 between the primary repel magnet 214 and the magnetic metal rod guide 206 in the non-pushed rest state as part of its novelty is to hold in position the push button assembly 110.

In FIG. 6B, the illustration represents a condition when the push button and push-rod plunger assembly 110 is briskly pushed in (downward) by a finger generated force and the previously (in FIG. 6A) magnetically attracted state 610 that existed between the primary repel magnet 214 and the push-rod magnetic metal guide 206 initially resists separation 612 but is now overcome and released from contact with metal guide 206 by the push force and separates 602 so the push button and push-rod plunger assembly 110 moves downward along with the primary repel magnet 214.

Further in FIG. 6A, when the magnetic attraction 610 that tightly held the push-rod guide 206 and primary repel magnet 214 together by virtue of (a high permeability connection) to guide 206 which had the majority of the primary repel magnet's 214 magnetic field lines concentrated within the magnetic metal push-rod guide's interior and the amount of magnetic field lines encompassing the coil windings (e.g. 508A, 502, FIG. 5A & FIG. 5B) was at a minimum and static state (no motion) inducing zero voltage at that time in the coil winding(s). When 214 is connected to 206, the magnetic field is concentrated within 206. When 214 briskly detaches from 206, the magnetic field is concentrated around the magnet and it has moved downward closer to the coil winding to produce an induced voltage.

Alternatively in FIG. 6B the state changes resulting from the application of a finger force pushing the push button assembly 110 downward; separating push-rod guide 206 and the launching magnet 214 physically and magnetically, changing the launching magnet 214 field lines from concentration at the push-rod guide 206 to an expansion of the majority of the magnet 214 magnetic field lines into and through the coil winding(s) (e.g. 508 502, FIG. 5A & FIG. 5B). As the launching magnet's 214 expanding or changing magnetic field lines through the coil windings 508, 502, a time varying voltage is now also induced in the coil winding and felt at the coil winding 508, 502 terminals. The criteria for designing the energy harvesting generator for optimum power output includes the strength of the magnets, the number of turns and gauge of wire used in the coil, the distance between the magnets, and the position of the reciprocating magnets within the coil winding, and any values given are for exemplary illustration and the embodiments are not limited thereto.

Figure 7A:
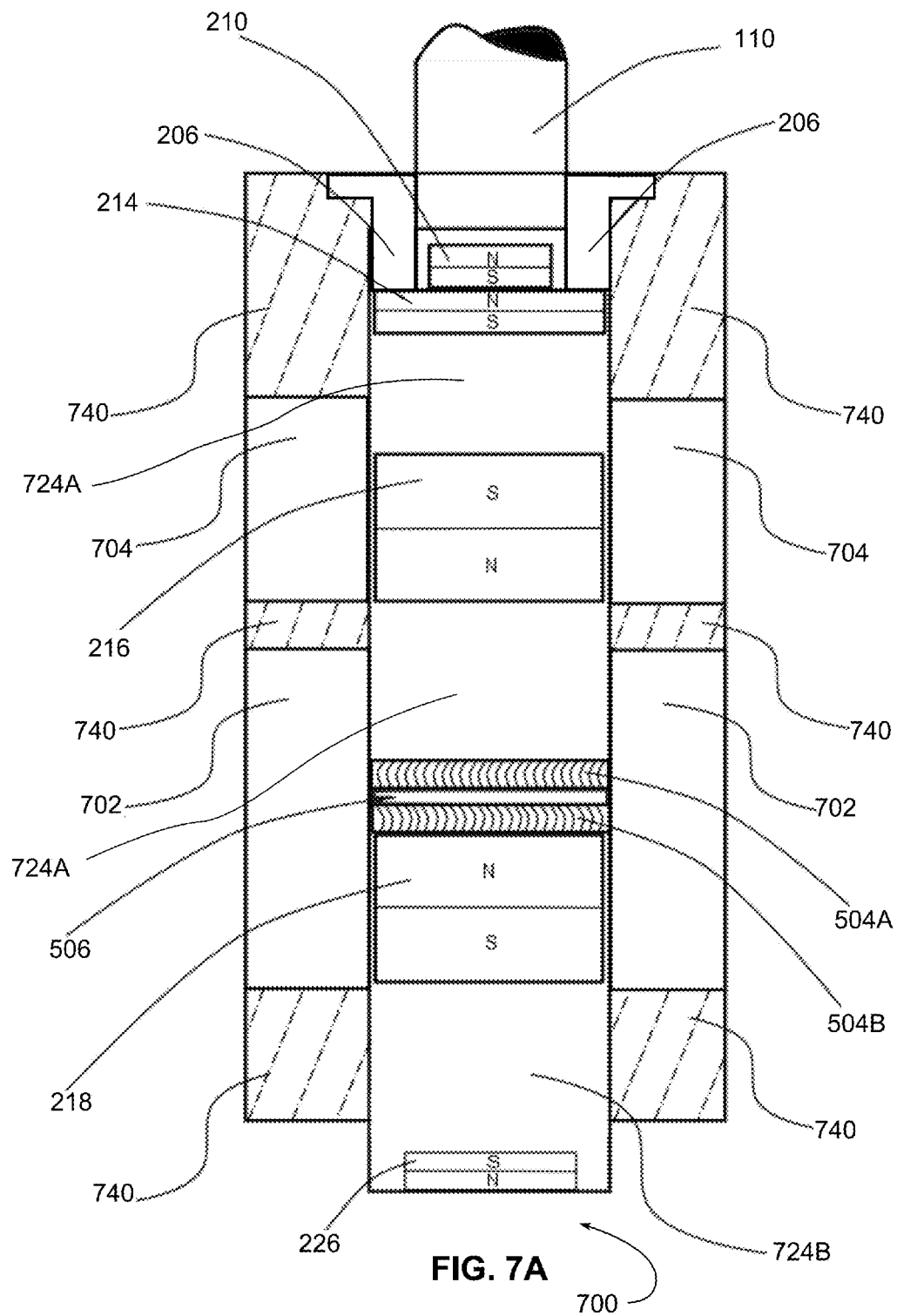
FIG. 7A is a cutaway view of a further alternate embodiment of the invention, where a top reciprocating magnet is free floating by its respective repulsive state with a launching and a bottom magnet attracted to a magnetic metal barrier.

FIG. 7A is an illustration for an alternate embodiment 700 of the present invention that shows a typical magnetic pole alternate embodiment having plural reciprocating magnets 216, 218 initially in a quiescent rest state and zero generator power output from either of two surrounding coils 704, 702. The exemplary embodiment 700 includes a pilot magnet 210 disposed and bonded at the bottom of the push-button 110 push-rod with its NORTH Pole facing upward and its SOUTH Pole facing downward degrees opposite of the NORTH Pole and it is attracted magnetically and seated on the primary repel magnet 214. The first reciprocating magnet 216, disposed below the launching magnet 214, has its SOUTH Pole facing the SOUTH Pole of the primary repel magnet 214 and in a rest state is suspended (hovers) in the aperture through-hole 222 volume within the coil bobbin 540 surrounded by the upper coil winding 508A. The first reciprocating magnet 216 has its NORTH pole facing downward at a distance towards the thin magnetic metal layer 506 that is disposed between the upper stationary plastic layer 504A and the lower stationary plastic layer 504B. In the rest state, the first reciprocating magnet 216 is suspended above the thin magnetic metal layer 506 that is disposed between the upper stationary plastic layer 504A and the lower stationary plastic layer 504B. During this quiescent, "non-pushed push button 110" condition, the second reciprocating repel magnet 218 is weakly attracted to the thin magnetic metal layer 506 that is disposed between the upper stationary plastic layer 504A and the lower stationary plastic layer 504B, and this weak attraction is the result of field attenuation by spacing provided by the non-magnetic plastic layers 504A & 504B. This attenuated field intensity, in a rest state, keeps the second reciprocating repel magnet 218 physically attached to the thin magnetic metal layer 506, and the second reciprocating repel magnet 218 has its NORTH pole facing the bottom plastic layer 504B, which is on a repelling "like pole" relationship with the first reciprocating repel magnet 216 (also in a rest state) wherein the second reciprocating magnet's SOUTH Pole faces the SOUTH Pole of the bottom repel magnet 226 that is disposed near or at the end of aperture 222 and bonded within the magnet well (107 in FIG. 1A) that is disposed at the end (bottom) of the coil bobbin 540.

The summary rest actions in FIG. 7A are that the launching magnet 214 magnetically repels the first reciprocating repel magnet 216 that is spaced apart from other magnets or structures within the aperture 222, and the second reciprocating magnet 218 is weakly magnetically attracted to the thin magnetic metal layer 506 and typically seated against the lower stationary plastic layer 504B, as well the second reciprocating repel magnet 218 is repelled by the bottom repel magnet 226 that is disposed and bonded at the end of aperture 222 typically within the magnet well (107, FIG. 1A).

Figure 7B:
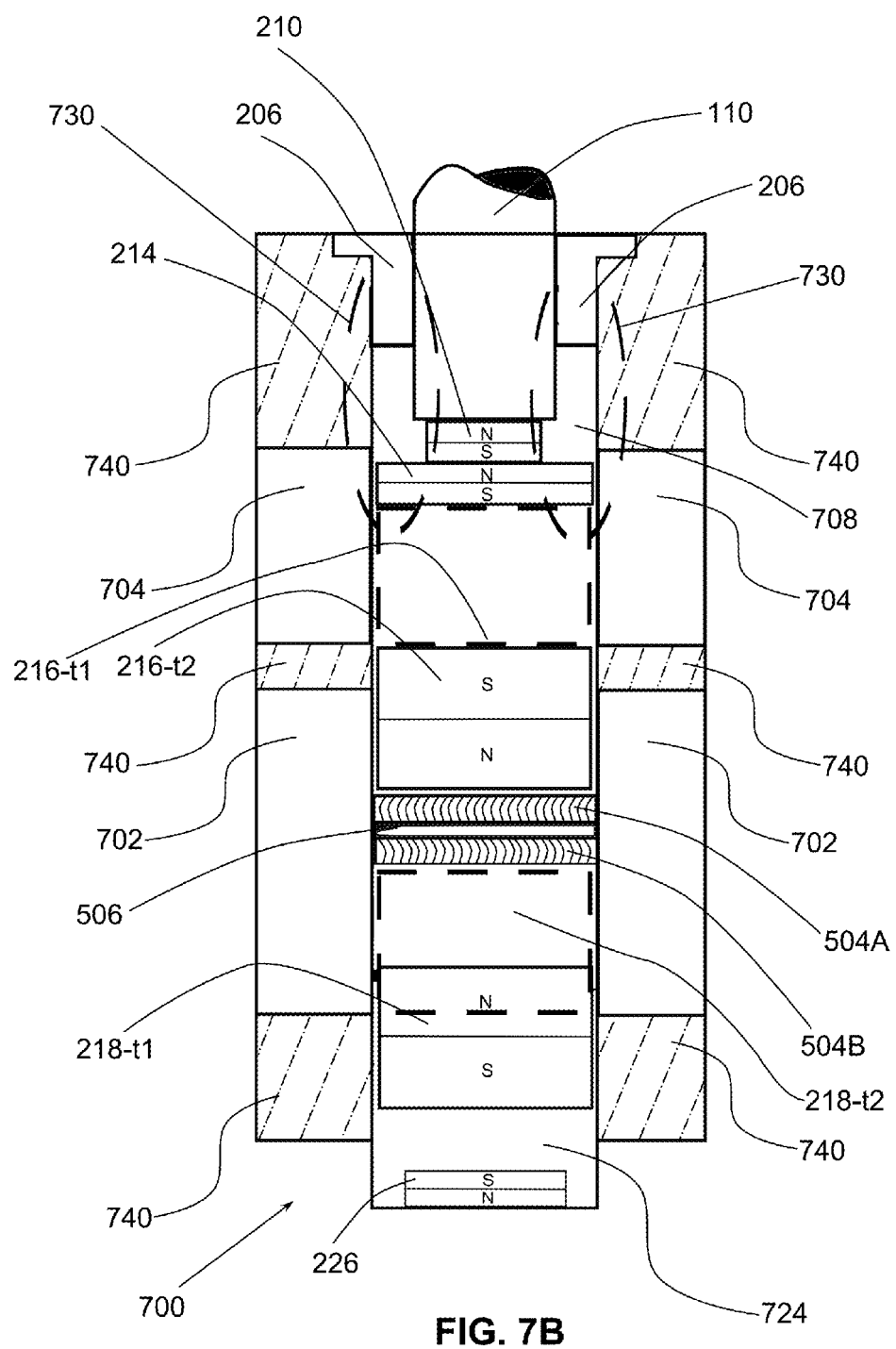
FIG. 7B is a cutaway view of the embodiment of FIG. 7A, where the two reciprocating magnets are re-positioned due to their respective repulsive states now changed with the launching magnet pushed inwardly.

FIG. 7B is an illustration of embodiment 700 showing the activated "finger pushed" state wherein the push button 110 assembly and pilot magnet 210 is pushed into the bobbin 740 (downward) by a finger force, causing the physical seated and magnetically attracted state (in FIG. 7A), between the push-rod guide 206 and the primary repel magnet 214-*t*1 to become separated by a downward displacement (through the through hole volume 222) created by this push action separation as shown 730. This action of downward displacement (through the through hole volume 222) progresses from the launching magnet's rest position 216-*t*1, in the first blind hole chamber 724A, to the "pushed forced state" position 214-*t*2, with the launching magnet 214-*t*2 being physically attracted to and in magnetic communication with the thin magnetic metal layer 506 that is disposed between the upper stationary plastic layer 504A and the lower stationary plastic layer 504B; wherein this action substantially simultaneously, by magnetic like pole repulsion, the second reciprocating magnet 218 from its rest position 218-*t*1, in the distal chamber 724 of aperture 222, having been attracted to the thin magnetic metal layer 506 that is disposed between the upper stationary plastic layer 504A and the lower stationary plastic layer 504B, is urged to its displaced (through the through hole volume 222) downward position 218-*t*2 that now is strongly repelled by the bottom repel magnet 226 that s disposed and bonded to the bottom of the magnet well (107, FIG. 1A).

When this downward pushed force that is transmitted (translated downward through (the through hole volume 222) by magnet repelling field lines) from the primary launching magnet 214 through the first reciprocating magnet's downward displacement 216-*t*1 to 216-*t*2 and then through the second reciprocating repel magnet's downward displacement 218-*t*1 to 218-*t*2, the repulsion force becomes great enough, as the distance between the second reciprocating magnet 218 and the stationary repel magnet 226 situated and bonded within the magnet well becomes closer to each other; the second reciprocating repel magnet reversed direction and now moves upward (through the through hole volume 222) 218-*t*2 to 218-*t*1 and becomes attached physically and is in weak magnetic communication with the thin magnetic metal layer 506 (separated by lower stationary plastic layer 504B) and this action in turn repels the first reciprocating magnet 216 upward, thus releasing it from attraction to the thin magnetic metal layer 506 (separated by the upper stationary plastic layer 504A) whereupon and now this first reciprocating magnet 216 is suspended again over the thin magnetic metal layer 506, as well as forcing the push button 110 up to its rest position where the primary launching magnet 214 returns to seat itself to the push-rod guide 206 and the system returns to its quiescent rest state or "pushed" state FIG. 8C. The coil winding 102 typical output voltage at its terminals through time shown in the rest state graph FIG. 8B and the corresponding output voltage for the activated state graph FIG. 8D.

During the rest or quiescent state as shown in FIG. 8A of the embodiment 800 where no force is acting on the push-button assembly 110, the first reciprocating magnet 216 hovers within the centered aperture (through-hole) of the coil bobbin 840 where a coil winding encompasses the coil bobbin's 840 central aperture 222; and it is suspended (hovers) in a region that is substantially outside a region of the aperture within the edges of the coil winding 102 region in the top area proximal to launching magnet 214. This suspension appears as floating and is a result of the mutual repulsive magnetic "like pole" forces between the primary repel magnet 214 that is attached to the pilot magnet 210 retained to the bottom of the push-button assembly 110, and the mutual repulsive magnetic "like pole" forces between the first reciprocating repel magnet 216 and the bottom repel magnet 226 where this bottom repel magnet 226 is disposed and bonded within the magnet well (107, FIG. 2). The primary repel magnet 214 is also magnetically attracted to and typically seated on the magnetic metal push-rod guide 806 to keeps the push button 110 in an up position during the rest state without a using a mechanical spring to return the push button to its quiescent position after activation.

In this rest state shown in FIG. 8A, there is no push movement applied and the first reciprocating magnet 216 hovers idle, suspended by the mutual top and bottom repulsive magnetic forces (from magnets 214, 218), keeping the first reciprocating magnet 216 in a hover position, which without application of external motion or forces eventually becomes substantially motionless, resulting in a substantially zero output voltage 802 at the coil winding 102 terminals over time as shown in the voltage-time plot FIG. 8B that illustrates a substantially zero output voltage line with usual electrical background low level (micro-volts) ambient noise 802;

As illustrated in FIG. 8C where a push force is applied to the push-button assembly 110 which is moved toward the coil 102 (downward) abruptly separating launching magnet 214 from the magnetic metal push-rod guide 806 causing a significant corresponding transient change in the magnetic field lines (and introducing a significant transient magnetic force) between the magnetic metal push-rod guide 806 and the primary repel magnet 214. The initial start time line position 214-*t*1 of the primary repel magnet 214 shows no voltage output from the generator coil winding 102 but when the detachment takes place abruptly, the slightest separation of launching magnet 214 from a magnetic surface causes a significant reduction in magnetic attraction which (if the force causing the separation continues) causes accelerated further separation proving an 'instant' seeming separation motion, wherein a corresponding significant and sudden change occurs in the primary repel magnet's 214 magnetic field that was concentrated within the magnetic metal push-rod guide 806, and the magnetic field of magnet 214 now expands outward to encompass and cut through the coil winding 102, whose action induces (by the Faraday effect) a voltage pulse felt at the coil winding 102 output terminals; this occurs from 214-*t*1 to 214-*t*2 and at 214-*t*2 the primary repel magnet 214 also repels downward through the coil winding 102 the causing the above-described motion of the reciprocating magnet 216 whose magnetic field lines also cut through the coil winding 102. As long as the reciprocating magnet 216 has movement, a voltage will be induced and provided at the coil winding 102 terminals. The bottom repel magnet 226, repels the oncoming reciprocating magnet 216 causing it to reverse direction and move back upward and again reverse direction in a reciprocating sequence repeated a number of cycles typically resembling damped sinusoidal movements diminishing to zero. During this damped mechanical movement time period, the reciprocating magnet's 216 magnetic field lines will cut through the coil winding, inducing a voltage felt at the coil winding 102 output terminals. This movement is damped, or diminishes due to kinetic energy transfer to induced electrical energy, air friction and other mechanical losses, and gravitational forces, and the induced sinusoidal voltage diminish accordingly.

Several representative reciprocating magnet [decaying] motion limits are also shown in FIG. 8C with exemplary corresponding induced output voltage wave crest sequencing is shown in the graph FIG. 8D. During the initial finger push downward the push-button assembly 110 that has the attached pilot magnet 210, the pilot magnet is in a unlike pole attractive seating of the primary repel magnet 214. The push button 110 moves from its quiescent (up) rest position 110R to the activated (down) state position 110P and at this time duration the primary repel magnet moves from it rest position 214-t1 to its active position 214-t2 during that time period 214Δt1; simultaneously the primary repel magnet 214 instantly abruptly itself from the magnetic metal guide 806; and this action, by the instant expansion of the magnetic field lines, induces a voltage pulse that is felt at the coil winding 102 output terminals.

The first pulse generated is typical (~10 milliseconds or less) of a magnetic circuit comprised of the push-rod guide 806 and the launching magnet 214 detaching and ma-king an "air gap" as illustrated in the time period section 214Δt1 in the graph FIG. 8D.

As previously described in detail the repulsive downward force of the launching magnet 214 acting on the reciprocating magnet 216 during the progressing time period 216Δt1, as the reciprocating magnet passes downward through the coil winding 102 center and then moves upward being repelled up by the bottom repel magnet 226 disposed within the magnet well 106 (shown in FIG. 2) it is "re-repelled" by the launching magnet 214 again, generates a sinusoidal waveform that is illustrated in the graph FIG. 8D; and this sequential action repeats itself for a few cycles in 216Δt2, 216Δt3, and 216Δt4; and in this illustration, the reciprocating magnet 216 produces a positive voltage swing during its travel for the top of the coil winding 102 to the center and a negative voltage swing during its travel from the center of the coil winding 102 to the bottom region.

The second pulse generated is typical (~10 milliseconds or less) of a magnetic circuit comprised of the push-rod guide 806 and the primary repel magnet 214 re-attaching and closing the "air gap" as illustrated in the time period section 214Δt2 in the graph 804.

FIG. 9A is an illustration of a further alternate embodiment 900 depicting two reciprocating magnets, where in a quiescent (resting) state, a first reciprocating magnet 216 is disposed and positioned in a region near the top of the coil winding 102 and a second reciprocating magnet 218 typically disposed in a region near the other end of aperture between magnet 216 and repel magnet 226 and typically proximal the edge of the coil winding 102 distal to launching magnet 214, with both magnet pairs 216, 218 and magnets 218, 226 positioned with their like poles facing each other. The rest position of the push button push-rod assembly is shown in its up position 110 R and having it pilot magnet 210 magnetically attracted to and initially seated on the launching magnet 214 and the launching magnet 214 is magnetically attracted to and seated on the push-rod guide 206. Further the launching magnet 214 repels the first reciprocating magnet 216 that is in turn repelling the second reciprocating magnet 218 which is repelled by the bottom repelling magnet 226 that is disposed at the end of aperture 222 so that the net result is that first reciprocating repel magnet 216 and the second reciprocating repel magnet 218 repelling each other and are suspended within the centered aperture 222 the coil bobbin 940 and within the coil winding 102. During this rest state with substantially no magnet 216, 218 motions. The induced voltage output felt at the coil winding 102 terminals remains substantially zero, with microvolts of ambient electrical noise FIG. 9B over time shown in the first voltage (electromotive force, e.g. voltage) graph FIG. 9B.

FIG. 9C illustrates the alternate embodiment 900 comprised of two reciprocating magnets 216, 218 in a "rest state," with no external finger pushing of the push-button assembly 110R; and conversely motion boundaries after a "finger push" (downward) on the push-button assembly 110P, the primary launching 214 that is "magnetically attached" to the push-rod guide 206 completing a "closed magnetic circuit," simultaneously and instantly moves downward with the push-button assembly 110P; and during that time period 214Δt1 a voltage pulse of a few milliseconds (typically ~10 milliseconds or less) is generated, which is felt at the coil winding 102 terminals. This voltage pulse (typically ~10 milliseconds or less) during time period 214Δt1 is generated by the movement of the launching magnet 214 when detached from the push-rod guide 206 and by doing so significantly changes the magnetic lines of force between the attached launching magnet 214 and the push-rod guide 206 during time period 214Δt1.

Substantially simultaneously with the separation of launching magnet 214 from the guide 206, the primary repel magnet 214 repels the first reciprocating magnet 216 (downward) into the upper region of the coil winding 102 that induces a sinusoidal voltage waveform V916Δt1 at the coil winding 102 output terminals during the time period 916Δt1; and this action causes the first reciprocating repel magnet 216 to repel the second reciprocating repel magnet 218 downward through the lower region of the coil winding 102 that induces a sinusoidal voltage waveform V218Δt1 at the coil winding 102 terminals during the time period 218Δt1 with a small phase shift (shown as two time references 955 and 957 between the two sinusoidal waveforms (each two time references shown in respectively in exemplary graphs FIG. 9D and FIG. 9E), however the resultant remains an additive effect of the two waveforms and this total resultant waveform is shown in the combined time period representation of the waveform 930 graph FIG. 9F.

Figure 9G:
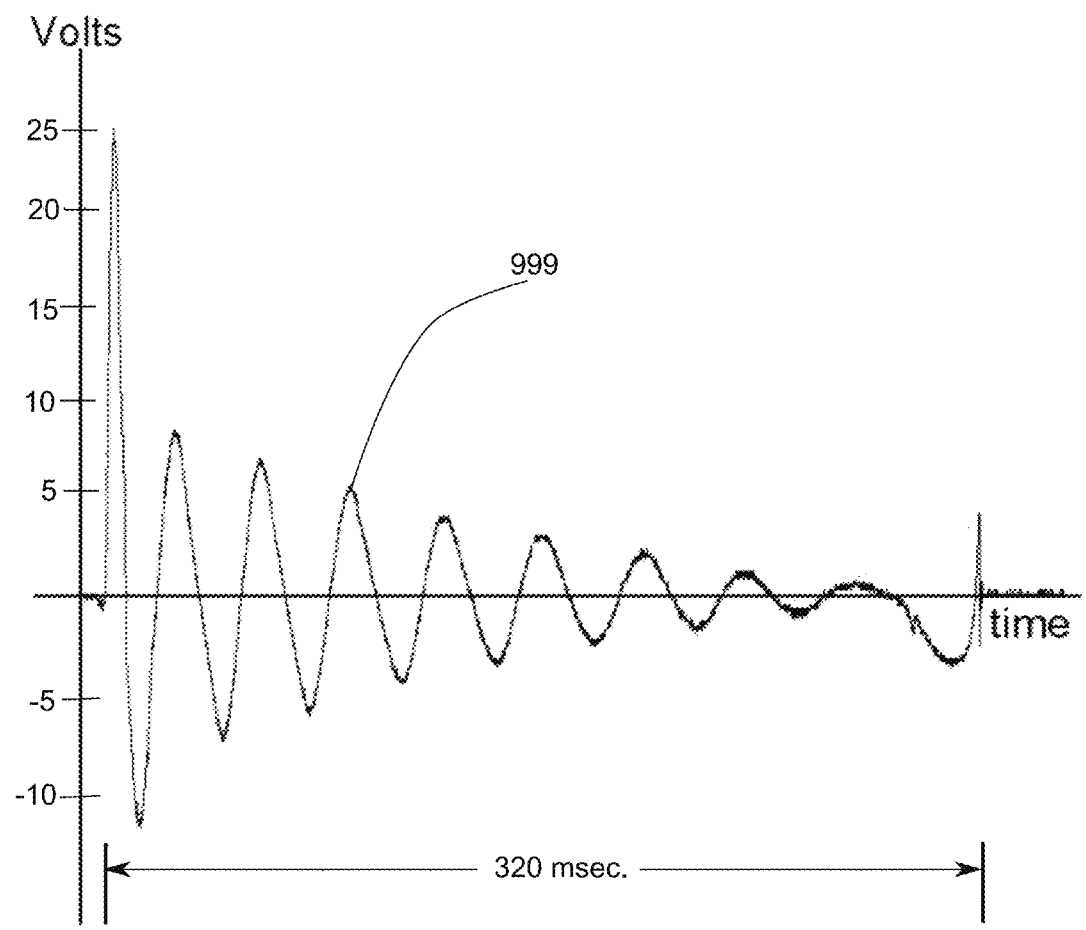
FIG. 9G is an actual exemplary waveform 999 displayed on a computer digital oscilloscope of coil 102 output signal for an exemplary system.

Due to repelling forces acting on the two reciprocating magnets 216, 218 in both directions downward and upward, by the diminishing (damped) residual time effects of this repulsion by the primary repel magnet 214 from the proximal end of the coil 102 in bobbin 940, and by the bottom by the repel magnet 226 disposed within the magnet well (107, FIG. 2) a diminishing repetition of the induced sinusoidal waveforms will occur for the first reciprocating repel magnet 216 in the time periods 916Δt1, 916Δt2, 916Δt3, & 916Δt4 (shown in graph FIG. 9D); and for the second reciprocating repel magnet 218 in the time period waveforms V218Δt1, V218Δt2, V218Δt3, & V218Δt4 (shown in graph FIG. 9E). The resultant output waveform 930 FIG. 9F developed from the algebraic combination of the associated waveforms produced by the first 216 and second 218 reciprocating repel magnets are represented in graph FIG. 9F as empirical mathematically graphical predictions represented by the graphs FIG. 9D, FIG. 9E, & FIG. 9F; as well this is shown in an actual exemplary waveform 999 displayed on a computer digital oscilloscope (Hantek model DSO-2250) trace 1100 in FIG. 9G of coil 102 output signal for an exemplary system including a magnet having pole strength of 5,300 Gauss with dimensions of 9.5 mm. diameter and 12.75 mm. in height; moving within a coil of 2,500 turns of #32 AWG soft drawn enameled solid copper wire.

Figure 10A:
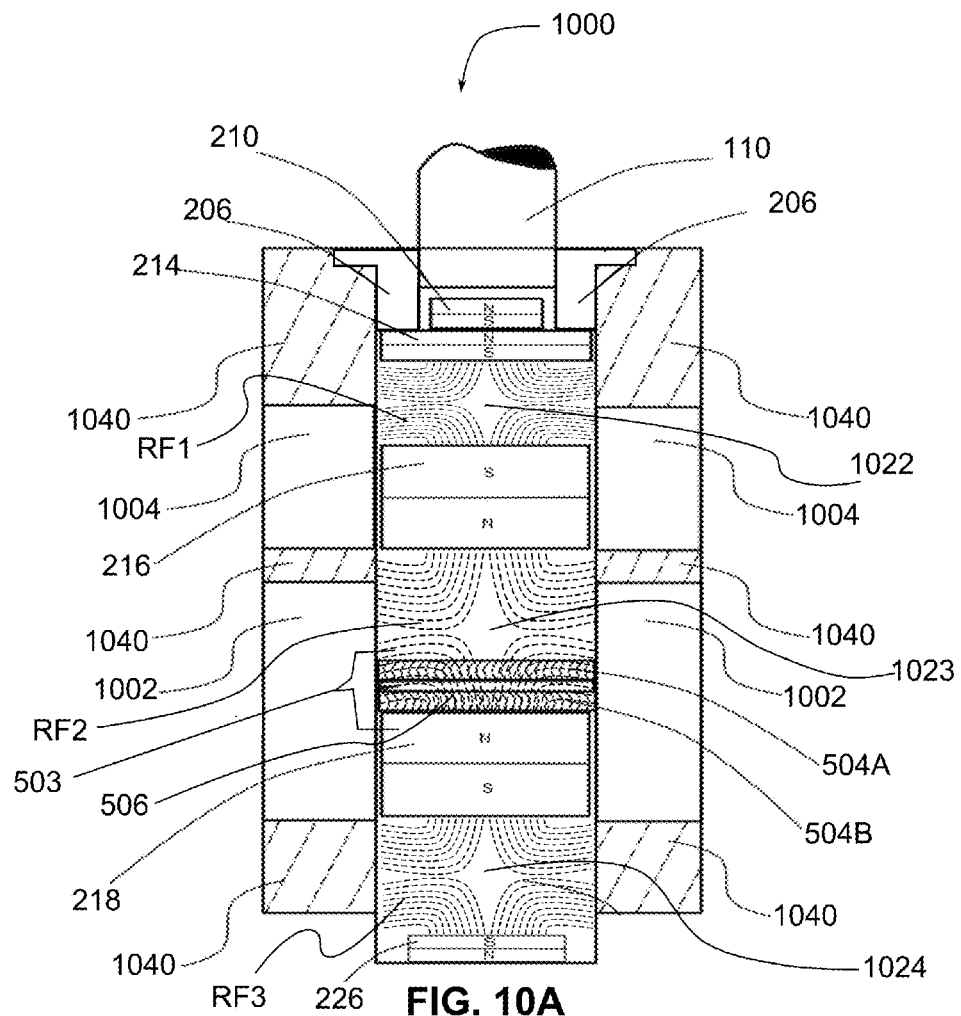
FIG. 10A is a cross section elevation of the embodiment of FIG. 7A the dual reciprocating magnets in their respective rest states with a layered mid-section layered.

FIG. 10A is another alternate embodiment 1000 shown in a quiescent or "rest state" that includes a layered barrier 503 comprised of a magnetic metal thin layer (electric grade steel or soft iron) or other magnetic material 506 between an upper thin plastic layer 504A and lower thin plastic layer 504B to selectively reduce or modify the magnetic interaction between the first reciprocating magnet 214 and the second reciprocating repel magnet 216. The layered barrier 503 selectively weakened mutual magnetic attraction of both the first 214 and second 216 reciprocating magnets.

Alternate embodiment 1000 of the present invention also has a push-button 110 including a push-rod that moves through a hollow push-rod travel guide 206 and the push-rod has a pilot magnet 210 mounted thereon and used to hold the launching magnet 214 to the push-button 110 push-rod by magnetic attraction of unlike magnetic poles as shown which allows the push-button 110 push-rod assembly to be inserted (and become connected to launching magnet 214 by magnetic attraction to pilot magnet 210) and removed from the generator coil bobbin 1040 (by pulling apart magnets 210, 214) for installation, security or other reasons. The launching magnet 214 has its one of its magnetic poles facing the same polarity pole of the first reciprocating repel magnet 216 so that there is a repulsive magnetic force field RF1 with this alignment between the launching magnet 214 and the first reciprocating repel magnet 216.

The first reciprocating repel magnet 216 is magnetically suspended (hovers) within the coil bobbin's 1040 an upper region 1022 of an aperture extending through coil bobbin 1040 and proximal launching magnet 214.

The second reciprocating repel magnet 218 is weakly attached magnetically to the layered barrier 503 comprising a magnetic metal thin layer (electric grade steel or soft iron) 506 or other magnetic material between an upper thin plastic layer 504A and lower thin plastic layer 504B; and this magnetic attachment is maintained in the "rest state" by the upward repulsive force that exists between the bottom repel magnet 226 that is disposed and bonded to the magnet well (e.g. 107 shown in FIG. 1A) and having the same magnetic pole facing the second reciprocating magnet 218 facing pole.

In the quiescent, non-pushed "rest state" of FIG. 10A, the first reciprocating magnet 216 is magnetically suspended (hovers) in the mid-section of the first coil winding 1004 due to the mutual repulsive magnetic field forces RF1 & RF2 between the launching magnet 214, the first reciprocating magnet 216 and the second reciprocating magnet 218 (initially magnetically attached to the barrier 503), which have like poles repelling magnetic field RF2 passing through the thin layered barrier 503 magnetic metal thin layer.

Figure 10B:
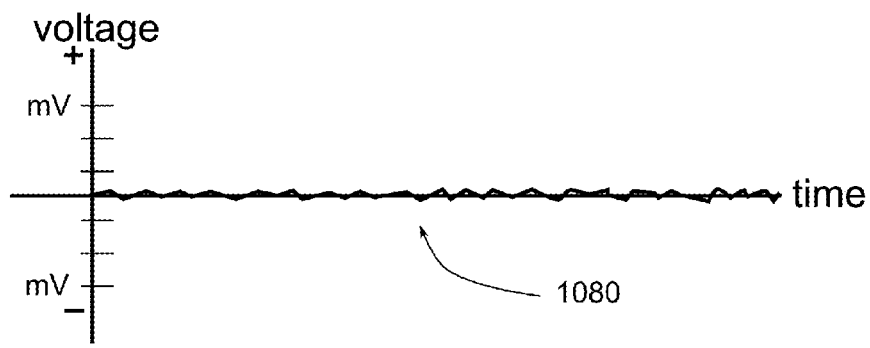
FIG. 10B is a plot of a resultant coil output voltage of zero volts along a time line that illustrates typical low level ambient background electrical noise

During the "rest state" of FIG. 10A, no force ("finger pushing action") is applied to embodiment 1000 push button assembly 110 which allows reciprocating magnets 216 and 218 to come to rest, inducing substantially no voltage output FIG. 10B from either of the coil windings 1004, 1002 output terminals, because obeying Faraday's Law, motion of the magnetic fields RF1, RF2, and RF3 surrounding the coil windings is required to generate an output voltage at the coil winding 1004, 1002 output terminals. In one exemplary embodiment, the coil windings 1002, 1004 are connected to add the respective induced output voltages.

Figure 10C:
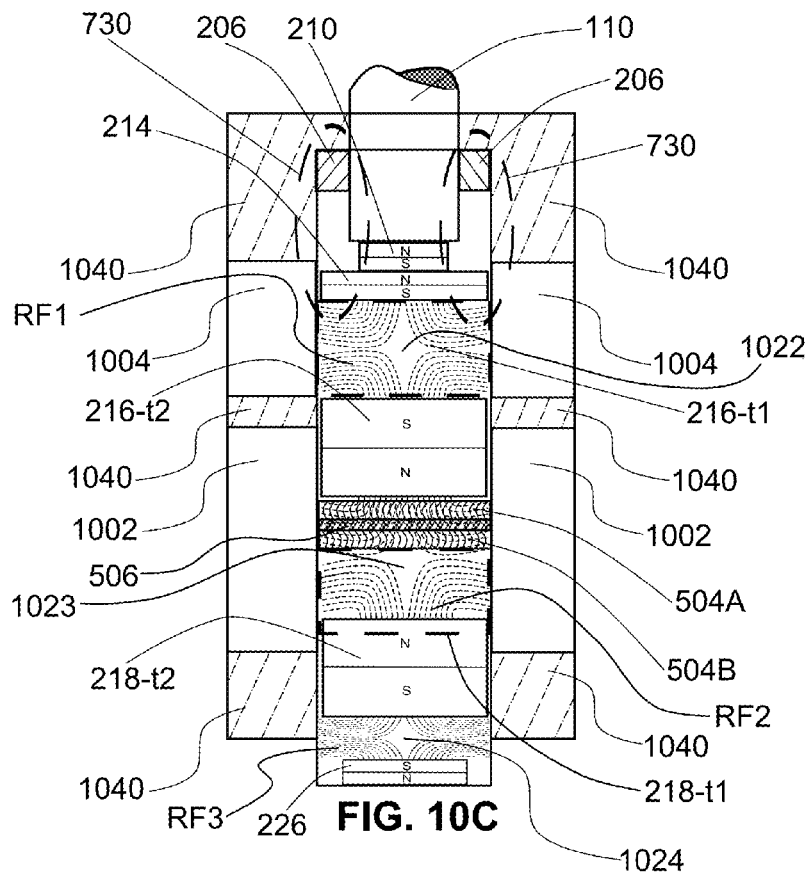
FIG. 10C is a cross section elevation of the embodiment of FIG. 7B the dual reciprocating magnets in a pushed down active state with a layered mid-section layered.
Figure 10D:
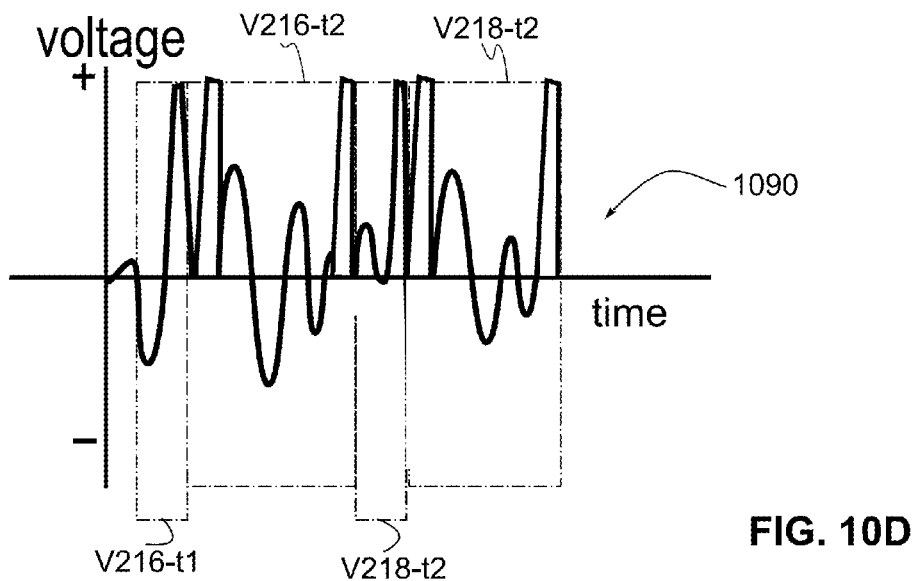
FIG. 10D is a time plot of the respective exemplary resultant coil voltage output waveforms generated from the pushed activity further showing the induced non-sinusoidal pulses and damped oscillatory waveforms combined.

FIG. 10C is an illustration of the alternate embodiment that shows the activated, or "finger pushed" state where the repelling magnetic field RF1 between the launching magnet 214 and the first reciprocating magnet 216 pushes the first reciprocating mag-net down during the $1^{st}$ time period 214-$t1$ (detaching push-rod travel guide 206 and primary repel magnet 214 in circled area 730) causing the first reciprocating magnet 214 to be magnetically attracted to then attached to the barrier layer 503 magnetic metal thin layer 506 (separated by an upper thin plastic layer 504A) and this action further causes the second reciprocating repel magnet 218 to detach itself (because of being repelled by the mutual repelling magnetic field RF2 established between 1st reciprocating magnet 216 and $2^{nd}$ reciprocating magnet 218) from the barrier layer 503 in the aperture region 1023 while the mutual repelling magnetic field RF3 existing due to facing same-poled second reciprocating magnets 218 and bottom repel magnet 226 that is disposed at or near the aperture end region 1024 distal from launching magnet 214. Corresponding induced voltage from a combination of coil 1002 and coil 1004 output signals is shown in the plot 1090 of FIG. 10D. Initially induced voltage is shown at V216-$t1$ and voltage from displace first reciprocating magnet 214 is shown at V216-$t2$. The voltage induced from the subsequent detachment of second reciprocating magnet from barrier 503 is shown at V218-$t1$, and the subsequently induce voltage from RF2 launched second reciprocating magnet 218 is shown at 218-$t1$.

The generator according to the present invention has application for powering various circuitry, e.g. a microcontroller based microchip ISMB and (e.g. 915 MHz in the US and 868 MHz in the UK and EU) transmitter or other electronics module 112 that can be attached by a snap on holding pin 124 (FIGS. 1, 2).

The exemplary embodiments of the present invention described above are operational in a gravitational field and in an upright position. However, the generators according to the present invention are fully operational in any orientation, with or without gravitational force, e.g. in free space, with substantially the same rest and activated/pushed modes as described herein. Moreover, the repulsive magnets fields overcome the effects of and neutralize gravitational (or other) forces in any position may be selectively adjusted to accommodate other objectives (e.g. size, output voltage, current and duration, reciprocation frequency, etc.). Further modifications and substitutions made by one of ordinary skill in the art are within the scope of the present invention, which is not limited, except by the claims which follow.

What is claimed is:

1. An energy harvesting device, comprising:
   a reciprocating magnet generator including a reciprocating magnet suspended to move cyclically along a path, and a coil of wire disposed around a portion of said magnet path providing an electrical output in response to said magnet cyclical motion along said path;
   a trigger disposed in a quiescent state to be separate from said reciprocating magnet, and to receive a physical force and impart an abrupt repulsion force between said trigger and said magnet to urge separation between said magnet and said trigger, wherein said abrupt repulsion force initiates said cyclical magnet movement along said path; and
   a trigger retainer disposed to retain said trigger in a quiescent state first position from which said trigger is moved to impart said abrupt repulsion force to said magnet, wherein
      said reciprocating magnet generator magnet includes a north pole and a southpole disposed along an axis substantially parallel to said path,
      said trigger comprises a magnet having a north pole and a south pole, and wherein
      one of said trigger magnet north pole and trigger magnet south pole is disposed to face the same polarity of one of said reciprocating magnet generator magnet north pole and said reciprocating magnet generator magnet south pole.

2. The energy harvesting device of claim 1, further including a housing retaining said reciprocating magnet, said trigger and said trigger retainer, and being in fixed relationship to said coil.

3. The energy harvesting device of claim 2, wherein said trigger includes a launching magnet providing said abrupt force and a push-rod disposed to transfer said physical force to said trigger magnet, wherein said push-rod extends at least partially through said housing, and is separable from said launching magnet.

4. The energy harvesting device of claim 3, wherein said push-rod includes a magnet oriented to provide magnetic attraction to said launching magnet.

5. A generator, comprising:
a housing including an elongated aperture therein extending along an axis;
a coil of wire wound about and along said axis over a length and formed to include at least a portion of said elongated aperture, said aperture having a first end, a second end and a midpoint of said length;
a first movable magnet disposed to be movable along a path including at least a portion of said coil aperture length;
a trigger disposed to impart a force to said first movable magnet toward said aperture midpoint comprising a magnetic field trigger providing a magnetic transient force to said first movable magnet; and
a suspension member disposed relatively proximal to said aperture second end and to resiliently suspend without contact therewith said first movable magnet in a quiescent position offset from said midpoint toward one of said aperture first end and said aperture second end.

6. The generator of claim 5, wherein said suspension member comprises a magnetic suspension imparting a repulsion force on said first movable magnet.

7. The generator of claim 6, wherein said magnetic suspension comprises a first suspension magnet substantially at said aperture second end, and further comprising a second suspension magnet substantially at said aperture first end wherein said first suspension magnet and said second suspension magnet have facing poles of opposite polarity.

8. The generator of claim 5, further comprising a second movable magnet disposed within said aperture between said first movable magnet and said suspension member, wherein said first movable magnet and said second movable magnet have facing poles of the same polarity and are movable relative to each other.

9. The generator of claim 8, further comprising a barrier disposed within said aperture and in fixed position along said aperture between said first movable magnet and said second movable magnet.

10. The generator of claim 9,
wherein said barrier comprises a magnetic material barrier disposed within said aperture to which said first movable magnet and said second movable magnet can be magnetically attracted, and
wherein said magnetic metal barrier is selected to allow one of said first and said second magnets seated thereon, to be unseated by the approach the other of said first and said second magnet.

11. The generator of claim 8, wherein said coil comprises a first coil, said generator further comprising a second coil disposed about said aperture in closer proximity to said second movable magnet than said first movable magnet.

12. The generator of claim 5, wherein said coil provides a non-sinusoidal output.

13. The generator of claim 5, wherein
said resilient suspension is disposed to permit periodic first movable magnet motion to either side of said quiescent position, and
wherein said coil of wire provides a periodic AC signal therefrom.

14. A generator, comprising:
a coil winding disposed around an axis and formed to include at least a portion of an elongated path having an axial length, a first end and a second end;
a movable magnet retained to move along at least a portion of said path, and having at least one each of a N pole and a S pole each disposed substantially along said axis and being movably along said path around which at least a portion of said coil is wound, said movable magnet being resiliently retained at a quiescent position there along; and
a trigger retained at a rest position separated from and facing said movable magnet and movable from said rest position by application of a force in excess of a threshold amount and disposed to impart a force on said movable magnet to move along said path toward said aperture midpoint when said trigger is moved from said rest position, and further including
a housing including an aperture and said coil disposed about said aperture, wherein
said trigger further includes a magnet having an attraction force urging contact with a portion of said housing, and wherein
a force of separation of said trigger magnet and said housing portion being said in excess of said threshold amount.

15. The generator of claim 14 further including a suspension magnet oriented and disposed to impart a suspension force on said movable magnet to urge said movable magnet to said quiescent position.

16. The generator of claim 14, further including a magnetic suspension disposed to provide a reciprocating movable magnet motion along said path and having varying proximity of said movable magnet relative to said coil.

* * * * *